United States Patent
Fischer et al.

(10) Patent No.: US 10,364,995 B2
(45) Date of Patent: Jul. 30, 2019

(54) UNIT WITH RECOVERY WHEEL AND ECONOMIZER AND METHOD OF CONTROL

(71) Applicant: SEMCO LLC, Columbia, MO (US)

(72) Inventors: John C. Fischer, Marietta, GA (US); Richard K. Mitchell, Columbia, MO (US)

(73) Assignee: SEMCO LLC, Columbia, MO (US)

( * ) Notice: Subject to any disclaimer, the term of this patent is extended or adjusted under 35 U.S.C. 154(b) by 449 days.

(21) Appl. No.: 14/968,390

(22) Filed: Dec. 14, 2015

(65) Prior Publication Data

US 2016/0169544 A1   Jun. 16, 2016

Related U.S. Application Data

(60) Provisional application No. 62/092,023, filed on Dec. 15, 2014.

(51) Int. Cl.
*F24F 11/00* (2018.01)
*F24F 3/044* (2006.01)
(Continued)

(52) U.S. Cl.
CPC .......... *F24F 11/0001* (2013.01); *F24F 3/044* (2013.01); *F24F 3/1423* (2013.01);
(Continued)

(58) Field of Classification Search
CPC .............. F24F 11/0001; F24F 11/30; F24F 2011/0002; F24F 3/044; F24F 3/1423;
(Continued)

(56) References Cited

U.S. PATENT DOCUMENTS

| 4,769,053 A | 9/1988 | Fischer, Jr. |
| 4,887,438 A * | 12/1989 | Meckler ............ F24D 5/12 62/271 |

(Continued)

OTHER PUBLICATIONS

Semco Inc.; FV Preconditioner Series Technical Guide; "http://htseng.com/default/products/PID636/resources/Technical%20Guide_FV%20Series.pdf"; Copyright 1996-2008.
(Continued)

*Primary Examiner* — Travis C Ruby
(74) *Attorney, Agent, or Firm* — Allan Watts

(57) ABSTRACT

Ventilating units that include a recovery wheel, a supply air outlet from the wheel, an outdoor air supply fan that moves outdoor air through the recovery wheel, an economizer damper that opens to bring outdoor air directly into the supply air outlet, and an exhaust air discharge fan that moves exhaust air through the recovery wheel and to outdoors; HVAC units that include air conditioning with an air handler supply fan, a recovery wheel, an economizer section, an outdoor air supply fan, and controls; and methods of controlling airflow in an HVAC unit that include controlling an economizer damper based on outdoor and return air temperature and enthalpy or dew point. Some ventilating units connect to a packaged air handler and other ventilating units include the air handler, cooling coil, and air handler supply fan. Some embodiments include another damper that opens to bypass the recovery wheel for power exhaust.

32 Claims, 9 Drawing Sheets

(51) Int. Cl.
*F24F 3/14* (2006.01)
*F24F 11/30* (2018.01)
*F24F 110/10* (2018.01)
*F24F 110/12* (2018.01)
*F24F 110/22* (2018.01)
*F24F 110/60* (2018.01)

(52) U.S. Cl.
CPC ....... F24F 11/30 (2018.01); *F24F 2011/0002* (2013.01); *F24F 2011/0006* (2013.01); *F24F 2110/10* (2018.01); *F24F 2110/12* (2018.01); *F24F 2110/22* (2018.01); *F24F 2110/60* (2018.01); *F24F 2203/104* (2013.01); *Y02B 30/767* (2013.01)

(58) Field of Classification Search
CPC .............. F24F 2110/22; F24F 2110/10; F24F 2110/12; F24F 2110/60; F24F 2110/0006; F24F 2203/104; F24F 12/001; F24F 2012/007; Y02B 30/767; Y02B 30/78; F28D 19/00; F28D 19/042
See application file for complete search history.

(56) References Cited

U.S. PATENT DOCUMENTS

| | | | |
|---|---|---|---|
| 5,300,138 A | 4/1994 | Fischer et al. | |
| 5,401,706 A | 3/1995 | Fischer | |
| 5,496,397 A | 3/1996 | Fischer et al. | |
| 5,548,970 A * | 8/1996 | Cunningham, Jr. | F24F 3/1423 165/8 |
| 5,826,641 A | 10/1998 | Bierwirth et al. | |
| 6,016,710 A | 1/2000 | Boles et al. | |
| 6,199,388 B1 | 3/2001 | Fischer, Jr. | |
| 6,328,095 B1 * | 12/2001 | Felber | F24F 3/1423 165/222 |
| 6,751,964 B2 | 6/2004 | Fischer | |
| 7,886,986 B2 | 2/2011 | Fischer, Jr. et al. | |
| 2003/0070787 A1 * | 4/2003 | Moffitt | F24F 12/001 165/4 |
| 2004/0000152 A1 * | 1/2004 | Fischer | F24F 3/1423 62/94 |
| 2008/0003940 A1 * | 1/2008 | Haglid | F24F 3/14 454/228 |
| 2010/0307733 A1 * | 12/2010 | Karamanos | F24F 13/04 165/254 |
| 2011/0146941 A1 * | 6/2011 | Benoit | F24F 12/006 165/11.1 |

OTHER PUBLICATIONS

Carrier; Product Data Supplement Manual: "EnergyXv2—Factory Installed Energy Recovery; Centurion Commercial Rooftop Units 2 to 25 Nominal Tons with PURON (R-410A) Refrigerant and COMFORTLink Controls"; Dec. 2009.

* cited by examiner

UNIT WITH RECOVERY WHEEL AND ECONOMIZER AND METHOD OF CONTROL

RELATED PATENT APPLICATIONS

This patent application is a non-provisional patent application of, and claims priority to, U.S. provisional patent application No. 62/092,023, filed Dec. 15, 2014, titled: AIR CONDITIONING UNIT WITH RECOVERY WHEEL AND ECONOMIZER, which has the same inventors and assignee. The contents of this priority provisional patent application are incorporated herein by reference. If there are any conflicts or inconsistencies between this patent application and any documents incorporated by reference herein, however, this patent application governs herein.

FIELD OF THE INVENTION

Various embodiments of this invention relate to ventilation and air conditioning units that include both a recovery wheel and an economizer, methods of controlling or configuring such a unit, and methods of reducing the energy consumption, increasing the effectiveness, or both, of an air conditioning unit.

BACKGROUND OF THE INVENTION

Heating, ventilating, and air-conditioning (HVAC) systems have been used to maintain desirable temperatures and humidity levels within buildings, and buildings have been constructed with ventilation systems including HVAC systems to provide comfortable and safe environments for occupants to live and work. To maintain fresh air within buildings and to reduce the level of indoor air contaminants, in many applications, at least a portion of the air handled by ventilation or HVAC systems has been taken from outdoors, while a portion of the indoor air handled by HVAC systems has been exhausted to outside the building.

In many situations, outside air introduced to the building to replace exhaust air must be cooled or heated before being introduced to the building to provide temperatures within desired parameters, and often must be dehumidified or humidified in order to keep humidity levels within desired ranges. But adding or removing heat or humidity (moisture) typically involves the expenditure of energy. To reduce the energy required to condition the outside air, recovery wheels have been used to transfer heat, moisture, or both, between exhaust air and incoming outside air. Examples of the prior art in these areas are described in U.S. Pat. Nos. 4,769,053 and 6,199,388, and U.S. Patent Application publication number 2004/0000152, all having at least one inventor in common with the subject matter of this. These prior art documents also describe many of the needs and benefits of such systems and the use of recovery wheels.

Even with recovery devices such as recovery wheels, HVAC systems still use a considerable amount of energy, including both for moving air (fan power) and further conditioning of supply air. To further reduce energy consumption, HVAC systems have been developed that reduce airflow when less flow is needed (variable air-volume systems). In many applications, variable-frequency drive systems have been provided for fan motors, with variable-speed controllers, to reduce fan speeds when full air volume is not needed. Variable voltage DC drives are another option. In some cases, a number of fans are used, and a portion of the fans are shut off when less flow is needed rather than (or in addition to) varying the speed of the fans. Variable air-volume systems have been used that reduce fan power required, that reduce the volume of outside air that must be conditioned, or both.

Further, in some situations, outside air is at a temperature such that the building can be cooled by introducing a higher percentage of unconditioned outside air or "free cooling", for example, rather than cooling air returned from the space using mechanical cooling (e.g., compressors). HVAC systems have been used having such an economizer wherein outside air is increased when appropriate to reduce energy consumption. Still further, ventilating units have been contemplated that combine a recovery wheel and an economizer. Such units and systems, however, used a return air damper to regulate or modulate flow of return air from the building in order to have the desired amount of outdoor air. Such prior art units and systems, however, required considerable fan energy to pull air through the return air damper. In addition, prior art units and systems have included economizers, but under certain conditions, economizer operation has resulted in supply air that has an undesirable level of humidity, making occupants uncomfortable even when indoor air temperature is within parameters.

Various needs, potential areas for benefit, or opportunities for improvement exist, for example, for ventilating units, HVAC units, energy recovery and economizer modules, and methods that reduce fan energy requirements in one or more modes of operation, that reduce or eliminate the need for a return air damper to regulate or modulate flow of return air from the building in order to have the desired amount of outdoor air, that avoid providing an undesirable level of humidity during economizer operation, or a combination thereof. Further, needs, potential areas for benefit, or opportunities for improvement exist, for example, for ventilating units, HVAC units, energy recovery and economizer modules, and methods that reduce fan energy requirements in multiple modes of operation, for example, when outdoor airflow rates change, for instance, during economizer operation, when total system airflow rates change to meet cooling demands, or both. Further still, needs, potential areas for benefit, or opportunities for improvement exist, for example, for ventilating units, HVAC units, energy recovery and economizer modules, and methods that avoid operating the economizer, and instead provide energy recovery, when outdoor air humidity, enthalpy, or dew point is excessive, or when certain thresholds for comfort are not met. Room for improvement exists over the prior art in various areas that may be apparent to a person of ordinary skill in the art having studied this document.

SUMMARY OF PARTICULAR EMBODIMENTS OF THE INVENTION

This invention provides, among other things, various units (e.g., ventilating units, HVAC units, or air conditioning units) that include a recovery wheel, an economizer, and an economizer damper. Various embodiments require no return air damper. Further, certain units include two or at least two (i.e., separate) fans, for example, at least two of an outdoor air supply fan, an exhaust air discharge fan, and an air handler supply fan. Still further, particular units use or compare a dew point, an enthalpy, or both to determine whether to run the economizer. This invention also provides various methods, for example, of controlling airflow in an HVAC unit, for instance, having a recovery wheel and an economizer. Some such methods include, as examples, controlling (e.g., opening and closing) an economizer damper under certain circumstances, for instance, based on different temperatures, enthalpies, dew points, or a combination thereof.

Various embodiments provide, for example, as an object or benefit, that they partially or fully address or satisfy one or more of the needs, potential areas for benefit, or opportunities for improvement described herein, or known in the art, as examples. For instance, certain embodiments provide various ventilating units, HVAC units, energy recovery and economizer modules, and methods that reduce fan energy requirements in one or more modes of operation in comparison with prior art units, that reduce or eliminate the need for a return air damper to regulate or modulate flow of return air from the building in order to have the desired amount of outdoor air, that avoid providing an undesirable level of humidity during economizer operation, or a combination thereof. Further, particular embodiments provide ventilating units, HVAC units, energy recovery and economizer modules, and methods that reduce fan energy requirements in multiple modes of operation, for example, when outdoor airflow rates change, for instance, during economizer operation, when total system airflow rates change to meet cooling demands, or both. Further still, certain embodiments provide ventilating units, HVAC units, energy recovery and economizer modules, and methods that avoid operating the economizer, and instead, in a number of embodiments, provide energy recovery, when outdoor air humidity, enthalpy, or dew point is excessive, or when certain thresholds for comfort are not met. Even further, particular embodiments provide compliance with updated code requirements, for example, (ASHRAE 90.1 2013).

Specific embodiments of the invention include, for example, various units for ventilating a space within a building. In a number of embodiments, for instance, such a unit includes a recovery wheel, an outdoor air supply fan, an economizer damper, an exhaust air discharge fan, or a combination thereof. Further, various embodiments include a supply air outlet from the recovery wheel, and the outdoor air supply fan draws a first stream of outdoor air into the unit and moves the first stream of the outdoor air through the recovery wheel to the supply air outlet. Still further, in a number of embodiments, the economizer damper opens to bring a second stream of the outdoor air into the supply air outlet. Even further, in various such embodiments, the exhaust air discharge fan moves exhaust air, for example, from the space within the building, through the recovery wheel, and blows the exhaust air out of the unit to outdoors.

In some such embodiments, the unit is an energy-recovery and economizer module for connection to, and operation with, a packaged air handler. In other embodiments, however, the unit includes the packaged air handler. In various embodiments, for example, the packaged air handler includes at least one cooling coil and an air handler supply fan that moves supply air first through the cooling coil and then to the space. Further, in a number of embodiments, the unit includes one enclosure, for example, containing the recovery wheel, the economizer damper, the outdoor air supply fan, and the exhaust air discharge fan. Still further, in a number of such embodiments, the one enclosure is assembled either at an installation site or prior to installation of the unit.

In particular integrated embodiments, the unit includes (e.g., within the one enclosure) at least one cooling coil and an air handler supply fan that moves supply air first through the cooling coil and then to the space. In a number of embodiments, the supply air includes (e.g., at least) a first portion of return air from the space and (e.g., at least one of) the first stream or the second stream of the outdoor air. Further, in various embodiments, the exhaust air that exits the unit through the exhaust air discharge fan is a second portion of the return air from the space. In a number of such embodiments, the air handler supply fan and the outdoor air supply fan both operate when the economizer damper is open.

Further, in various embodiments, the unit includes (e.g., within the one enclosure) an energy recovery section and an economizer section. Further, in certain embodiments, the energy recovery section includes a supply air portion, an exhaust air portion, and an energy recovery interior wall separating the supply air portion from the exhaust air portion. A number of embodiments have an opening in the energy recovery interior wall and the recovery wheel extends through the opening in the energy recovery interior wall. Thus, in various embodiments, the recovery wheel is located partially in the supply air portion and partially in the exhaust air portion. Still further, some such embodiments include an energy recovery outdoor air inlet, for example, connected to the supply air portion.

Even further, in a number of embodiments, the energy recovery section includes the outdoor air supply fan. In various embodiments, for example, the outdoor air supply fan is located in the supply air portion of the energy recovery section and draws the first stream of the outdoor air into the supply air portion through the energy recovery outdoor air inlet. Further still, in various embodiments, the outdoor air supply fan moves the first stream of the outdoor air through the recovery wheel within the supply air portion. Even further still, a number of embodiments of an energy recovery section include an exhaust air outlet, for example, connected to the exhaust air portion. Moreover, a number of embodiments of an energy recovery section include the exhaust air discharge fan, for instance, located in the exhaust air portion of the energy recovery section. In various embodiments, the exhaust air discharge fan moves the exhaust air through the recovery wheel, for example, within the exhaust air portion. Furthermore, in a number of embodiments, the exhaust air discharge fan blows the exhaust air out of the energy recovery section through the exhaust air outlet.

Further, in a number of embodiments, the economizer section includes a supply air passageway (e.g., extending through the economizer section), an exhaust air passageway (e.g., extending through the economizer section) and an economizer interior wall separates the supply air passageway from the exhaust air passageway. Still further, in various embodiments, the economizer section includes an (e.g., at least one) economizer outdoor air inlet, for example, connected to the supply air passageway. Further still, in a number of embodiments, the economizer section includes the economizer damper. Even further, in various embodiments, the economizer damper is between the (e.g., at least one) economizer outdoor air inlet and the supply air passageway. Moreover, in a number of embodiments, when the economizer damper is open, the second stream of the outdoor air is allowed to enter the supply air passageway through the at least one economizer outdoor air inlet, and when the economizer damper is closed, the outdoor air is substantially prevented from entering the supply air passageway through the at least one economizer outdoor air inlet. Even further still, in various embodiments, the one enclosure at least substantially encloses the energy recovery section and the economizer section. Additionally, in a number of embodiments, the energy recovery outdoor air inlet, the exhaust air outlet, and the economizer outdoor air inlet each penetrate the one enclosure.

In various integrated embodiments, the unit further includes (e.g., within the one enclosure) an air handling section, for instance, that includes at least one cooling coil and an air handler supply fan that moves supply air first through the cooling coil and then to the space. Moreover, in a number of embodiments, when the unit is assembled for operation, the economizer section is between the energy recovery section and the air handling section. Further, in various embodiments, when the unit is assembled for operation, the supply air passageway (e.g., extending through the economizer section) connects to the supply air portion in the energy recovery section. Still further, in a number of embodiments, the exhaust air passageway (e.g., extending through the economizer section) connects to the exhaust air portion in the energy recovery section. Even further, in a number of embodiments (e.g., that include at least one cooling coil and an air handler supply fan that moves supply air first through the cooling coil and then to the space), when the unit is assembled and operating, the supply air passageway (e.g., extending through the economizer section) connects to an outdoor air/return air inlet section of the air handling section. Even further still, in a number of embodiments, the exhaust air passageway (e.g., extending through the economizer section) connects to a return air plenum serving the air handling section. In various embodiments, the outdoor air from (e.g., at least one of) the recovery wheel or the economizer damper becomes the supply air. Moreover, in various embodiments, when the unit is assembled, the one enclosure includes an inlet side that has the energy recovery outdoor air inlet and the economizer outdoor air inlet, and an outlet side that has the exhaust air outlet. In a number of embodiments, the inlet side is opposite the outlet side.

Various embodiments further include a power exhaust bypass damper, for example, that opens to allow at least part of the exhaust air to exit the unit through the exhaust air discharge fan without passing through the recovery wheel. In a number of such embodiments, for example, the power exhaust bypass damper is between the exhaust air discharge fan and the exhaust air passageway in (e.g., extending through) the economizer section. In various embodiments, when the power exhaust bypass damper is open, return air from the return air plenum serving the unit is allowed to exit the exhaust air passageway through the power exhaust bypass damper, through the exhaust air discharge fan, and through the exhaust air outlet, for example, without passing through the recovery wheel. Further, in a number of embodiments, when the power exhaust bypass damper is closed, return air from the return air plenum serving the ventilating unit is substantially prevented from exiting the exhaust air passageway through the exhaust air outlet without passing through the recovery wheel.

In a number of embodiments, the power exhaust bypass damper is opened to avoid over-pressurizing the building, for example, when the economizer damper is at least partially open. Further, in various embodiments, the power exhaust bypass damper is closed to increase effectiveness of the recovery wheel, for instance, when the economizer damper is closed. Still further, in a number of embodiments, the power exhaust bypass damper is modulated to control building static pressure when the economizer damper is at least partially open. Even further, in some embodiments, speed of the exhaust air discharge fan is modulated to control building static pressure when the power exhaust bypass damper is open. In a number of embodiments, for example, building static pressure is modulated based on a signal from a building static pressure sensor.

In various embodiments, the unit is operated without a return air damper, for example, restricting flow of return air from the space to the air handler supply fan. In a number of embodiments, the unit is operated, for example, without a return air damper restricting flow of return air while delivering the second stream of the outdoor air through the economizer damper and the first stream of the outdoor air through the recovery wheel. Further, in various embodiments, the first stream and the second stream of the outdoor air combine in the unit to provide a combined stream of the outdoor air to the space. In some embodiments, this combined stream of the outdoor air is approximately 100 percent of a volumetric flow rate of the air handler supply fan when the unit is operated with the economizer damper closed.

In certain embodiments, at least one dew point, at least one enthalpy, or both, are used, for example, to determine whether to open the economizer damper. Further, a number of embodiments include a controller that controls, for instance, the economizer damper. Still further, in a number of embodiments the controller (e.g., also) controls speed of the recovery wheel, mechanical cooling, or both. Even further, in some embodiments, the controller controls (e.g., the economizer damper, recovery wheel speed, mechanical cooling, or a combination thereof) based on measured parameters. In some embodiments, for instance, these measured parameters include outdoor air temperature; outdoor air humidity, enthalpy, or dew point; space or return air temperature; space or return air humidity, enthalpy, or dew point; or a combination thereof. Further still, in particular embodiments, the controller further controls (e.g., the economizer damper, speed of the recovery wheel, mechanical cooling, or a combination thereof) based on desired supply air temperature, for example, leaving the air handling section that contains the mechanical cooling.

Other specific embodiments include HVAC units that include an air conditioning unit, a recovery wheel, an economizer section, an outdoor air supply fan, and various controls. In a number of embodiments, for example, the air conditioning unit includes an air handler supply fan, mechanical cooling, and an air inlet. Further, in various embodiments, the recovery wheel has a supply air outlet, for example, connected to the air inlet of the air conditioning unit. Still further, in a number of such embodiments, the economizer section includes an economizer damper that opens to introduce outdoor air, for example, between the supply air outlet of the recovery wheel and the air inlet of the air conditioning unit. Even further, in various embodiments, the outdoor air supply fan is separate from the air handler supply fan. Even further still, in a number of embodiments, the controls control the economizer damper, speed of the recovery wheel, the mechanical cooling, or a combination thereof.

In a number of such embodiments, the air handler supply fan and the outdoor air supply fan both operate when the economizer damper is open. Further, in various embodiments, the HVAC unit includes an exhaust air discharge fan, for instance, that moves exhaust air from a space within a building through the recovery wheel, and, in a number of embodiments, blows the exhaust air out of the HVAC unit to outdoors. Still further, in some such embodiments, the HVAC unit includes a power exhaust bypass damper, for example, that opens to allow at least part of the exhaust air to exit the HVAC unit through the exhaust air discharge fan without passing through the recovery wheel.

Still other specific embodiments include various methods of controlling airflow in an HVAC unit having a recovery wheel and an economizer when a space served by the HVAC unit is calling for cooling. In a number of embodiments, for example, such a method includes opening an economizer damper in the economizer to bring in more than a minimum ventilation requirement of outdoor air and modulating a position of the economizer damper to maintain a supply air temperature set point when a first set of conditions exist. This first set of conditions includes, in various embodiments, outdoor air enthalpy being less than return air enthalpy or outdoor air dew point being less than return air dew point. Further, in some embodiments, this first set of conditions includes (e.g., in addition) outdoor air temperature being less than return air temperature, the outdoor air temperature being greater than a minimum threshold temperature set point, or both. Moreover, in a number of embodiments, the method includes closing the economizer damper, and providing energy recovery with the recovery wheel, when a second set of conditions exists. This second set of conditions includes, in various embodiments, the outdoor air enthalpy being greater than the return air enthalpy, the outdoor air temperature being greater than the return air temperature, or the outdoor air dew point being greater than a maximum threshold dew point set point. Further, in some embodiments, this second set of conditions includes (e.g., in addition) the outdoor air dew point being greater than the return air dew point. Still further, in a number of embodiments, the method includes closing the economizer damper and providing energy recovery with the recovery wheel when the outdoor air temperature is less than the minimum threshold temperature set point (e.g., regardless whether the second set of conditions exists).

In a number of embodiments, the method further includes determining: the outdoor air enthalpy, the return air enthalpy, the outdoor air dew point, the return air dew point, the outdoor air temperature, the return air temperature, the minimum threshold temperature set point, the maximum threshold dew point set point, or a combination thereof. Further, in various embodiments, the method includes comparing: the outdoor air enthalpy to the return air enthalpy, the outdoor air dew point to the return air dew point, the outdoor air temperature to the return air temperature, the outdoor air temperature to the minimum threshold temperature set point, the outdoor air dew point to the maximum threshold dew point set point, or a combination thereof. Still further, in a number of embodiments, the method includes opening a power exhaust bypass damper, for example, to allow exhaust air to exit the HVAC unit to outdoors without passing through the recovery wheel. In addition, various other embodiments of the invention are also described herein, and various benefits of certain embodiments may be apparent to a person of ordinary skill in the art.

Figure 1:
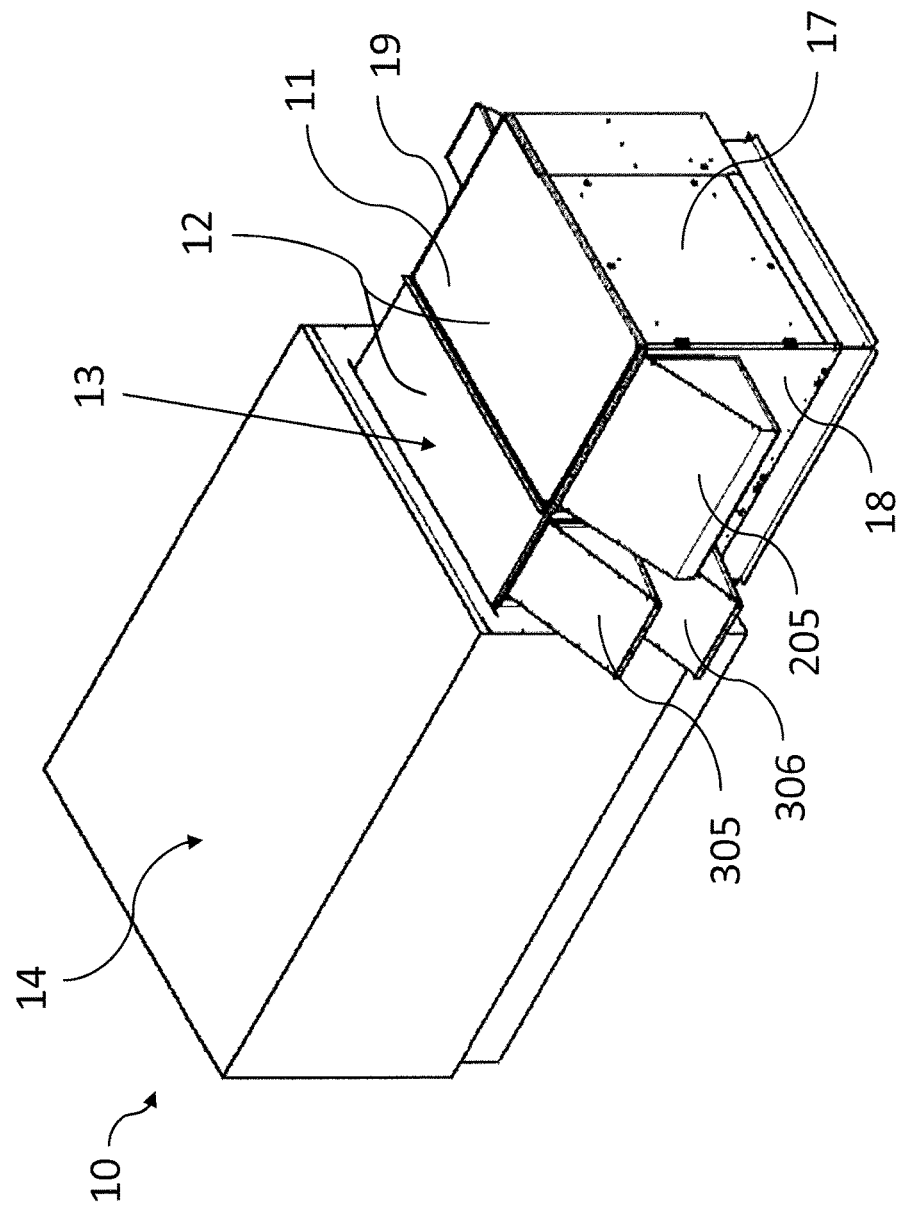
FIG. 1 is an isometric view of an example of a ventilating unit or HVAC unit that includes an air handler and an energy-recovery and economizer module that consists of an energy recovery section and an economizer section positioned between the outlet of the energy recovery section and the inlet of the HVAC unit.

The drawings provided herewith illustrate, among other things, examples of certain aspects of particular embodiments. Other embodiments, however, may differ. Various embodiments may include aspects shown in the drawings, described in the specification (including the claims), described in the other materials that are incorporated by reference, known in the art, or a combination thereof, as examples. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments are or concern apparatuses and methods such as ventilating units, including energy recovery and economizer modules, as well as HVAC units, and methods of controlling HVAC units, for instance, having a recovery wheel, an economizer, or both.

Prior art systems have been designed with a recovery wheel that use the HVAC supply air fan (e.g., 52 described below) to pull air both from the building (i.e., return air) and through the recovery wheel (e.g., analogous to stream 26 described below) by modulating return and outdoor air dampers. Such systems, however, had increased fan energy requirements, for instance, due to the need to add artificial static to the return air damper (e.g., during normal operation) to achieve the desired outdoor airflow through the recovery wheel. Certain embodiments of the present invention, however, include, for example, various ventilating or HVAC units that each include a recovery wheel, an economizer, an economizer damper, an energy recovery section outdoor air supply fan, and, in a number of embodiments, no return air damper. In various embodiments, omitting a return air damper reduces fan energy requirements, for example, makes the unit more efficient, or both. As used herein, an HVAC unit is a unit that provides heating, air conditioning, or both, and that also provides ventilation (i.e., air movement). Further, as used herein, a ventilating unit is a unit that provides ventilation. In a number of embodiments, a ventilating unit can also provide heating, air conditioning, or both. Thus, as used herein, an HVAC unit is a type of ventilating unit.

Various embodiments include HVAC units that include a recovery wheel, an economizer, a supply air fan, and an outside air fan separate from the supply air fan, as an example. In a number of embodiments, having an outside air fan separate from the supply air fan allows for independent control of outside air and supply air, for example, by varying the speed of one or more of these fans, for instance, in a variable air volume (VAV) system. In a number of embodiments, at least some significant airflow rates can be controlled without damping (e.g., all or part of the airflow through the fan), which can reduce fan energy. In certain embodiments, an HVAC unit includes, for example, a rooftop system (e.g., an air handler or air conditioning unit), a recovery unit (e.g., an energy recovery and economizer module) that includes a recovery wheel, an economizer, and an economizer damper, for instance, positioned between the recovery unit and the rooftop system.

A number of embodiments include an economizer damper, for example, positioned between the supply air outlet of the recovery wheel and the air inlet of the air conditioning unit. Particular embodiments, for example, include various HVAC units that include an air conditioning unit having an air inlet, a recovery wheel having a supply air outlet, an economizer section having an economizer damper positioned between the supply air outlet of the recovery wheel and the air inlet of the air conditioning unit, and no return air damper. Further embodiments include various HVAC units that include an air conditioning unit having an air inlet, a recovery wheel having a supply air outlet, an economizer section having an economizer damper positioned between the supply air outlet of the recovery wheel and the air inlet of the air conditioning unit, a supply air fan, and an outside air fan separate from the supply air fan. Still further embodiments include various HVAC units that include a rooftop system having an air inlet, a recovery unit that includes a recovery wheel and a supply air outlet, and an economizer section having an economizer damper positioned between the supply air outlet of the recovery unit and the air inlet of the air rooftop system.

Further, in a number of embodiments, a dew point is used, for example, to determine whether to run the economizer (i.e., whether to open the economizer damper). Further still, in various embodiments, an enthalpy is used to determine whether to run the economizer, as another example. Even further, in some embodiments, both a dew point and an enthalpy are used to determine whether to run the economizer, for example, to avoid high space humidity during economizer operation. In various such embodiments, the HVAC unit includes a recovery wheel, includes no return air damper, includes a supply air fan, includes an outside air fan separate from the supply air fan, or a combination thereof. Even further still, in some embodiments having a supply air fan, the supply air fan is driven by a first variable speed drive, in various embodiments having an outside air fan, the outside air fan is driven by a second variable speed drive, or both. In a number of embodiments, a variable-speed drive can include a frequency inverter or a variable frequency drive, for example. In some embodiments, electronically commutated motors are used, for instance.

Further embodiments include various methods, for instance, of controlling airflow in an HVAC unit, for example, having a recovery wheel, an economizer, or both. In a number of embodiments, for example, the method includes (e.g., in any order), at least certain acts. Such acts can include, for example, acts of controlling at least one fan speed, and not controlling a return air damper. Various embodiments further include, for instance, an act of controlling the recovery wheel, an act of controlling the economizer, or both. Moreover, certain embodiments include an act of controlling an economizer damper. In particular embodiments, however, the economizer damper is either fully open or fully closed, for instance, rather than damping airflow through the damper and consuming fan energy.

Still further, in a number of embodiments, the act of controlling at least one fan speed includes controlling a supply air fan, for example. Further still in some embodiments, the act of controlling at least one fan speed includes controlling an outside air fan (e.g., an outdoor air supply fan). Even further still, particular embodiments include an act of using a dew point to determine whether to run the economizer, an act of using an enthalpy to determine whether to run the economizer, or both, as examples. Moreover, certain embodiments include, for instance, an act of driving a supply air fan with a first variable speed drive, an act of driving an outside air fan with a second variable speed drive, or both.

In some embodiments, the method includes an act of controlling building static pressure, for example, by controlling powered exhaust, for instance, during economizer operation. Further, in certain embodiments, the method includes an act of using the same exhaust fan for recovery (e.g., passing exhaust air through the recovery wheel) and for powered exhaust, for instance, during economizer operation. In some embodiments, for example, air is bypassed around the exhaust air side of the recovery wheel during economizer power exhaust operation. Even further, in a number of embodiments of a method of controlling airflow in an HVAC unit having a recovery module containing a recovery wheel and an economizer, the method includes (e.g., at least) an act of using a fan in the recovery module for power exhaust during operation of the economizer to control building static pressure. In some embodiments, the exhaust flow from the energy recovery module can be a certain percentage of supply air flow during economizer operation. This "certain percentage" can be, for example, between 60 and 100 percent, between 70 and 90 percent, between 75 and 85 percent, or 80 percent, as examples.

Still further, in some embodiments, the method includes an act of determining whether a dew point exceeds a threshold during economizer operation, and if the dew point (e.g., of the outside air) exceeds the threshold during the economizer operation, dehumidifying outside air through the recovery wheel. In this manner, the recovery wheel can be put to beneficial use (e.g., to dehumidify outside air coming into the building) even when the economizer is being used. In a number of embodiments, the recovery wheel is a total energy recovery wheel, for example, with at least a 50 percent energy recovery effectiveness.

Particular embodiments include various methods of controlling airflow in an HVAC unit having a recovery wheel and an economizer. In a number of embodiments, for example, the method includes (e.g., in any order) at least the acts of controlling a first speed of a supply air fan that moves supply air, controlling a second speed of an outside air fan that moves outside air, and varying the first speed of the supply air fan to vary a first airflow rate of the supply air without changing a second airflow rate of the outside air. In a number of (e.g., such) embodiments, the supply air is not dampened, the outside air is not dampened, or both. In this context, dampening the flow of air means passing the air through a control damper that is partially open in order to actively control the airflow through the damper. Further, in various embodiments, the return air is not dampened.

Various methods of controlling airflow in an HVAC unit (e.g., having a recovery wheel, an economizer, or both) include (e.g., at least) an act of operating the economizer (e.g., only) when an outside air dew point (e.g., measured) is less than a maximum threshold dew point. In some embodiments, for example, this maximum threshold dew point can be between 50 and 60 degrees, between 52 and 58 degrees, between 53 and 57 degrees, between 54 and 56 degrees, or 55 degrees F., for example. Further, some such embodiments, some other embodiments, or both, include operating the economizer (e.g., only) when the outside air dew point is less than a return air dew point (e.g., at all or by a specific amount). Still further, some methods include operating the economizer (e.g., only) when outside air enthalpy is less than return air enthalpy (e.g., at all or by a specific amount). Even further, some embodiments include operating the economizer (e.g., only) when outside air temperature is less than return air temperature (e.g., at all or by a specific amount). Further still, some embodiments include operating the economizer (e.g., only) when outside air temperature is less than a space temperature set point (e.g., at all or by a specific amount).

Moreover, some embodiments include operating the economizer (e.g., only) when outside air temperature is greater than a minimum threshold temperature (e.g., at all or by a specific amount), for instance, under conditions where the space calls for cooling and there is a low outdoor air temperature, but there is a risk of delivering air that is too cold to the space. Even further still, some embodiments include prohibiting the operation of the economizer when outside air temperature is lower than a minimum threshold temperature (e.g., at all or by a specific amount) where over-cooling of the space might be of concern. Such a minimum threshold temperature, and other thresholds identified herein unless indicated otherwise, can be input, selected, or chosen by an operator, for example, or during system testing, adjusting, and balancing. Such a minimum threshold temperature can be, for example, below 45 degrees, below 40 degrees, below 35 degrees, below freezing, between 30 and 40 degrees, between 32 and 38 degrees, between 33 and 37 degrees, between 34 and 36 degrees, or 35 degrees, as examples.

Different embodiments require different combinations of these criteria for economizer operation. Certain embodiments require all of these criteria, for example. All possible combinations are contemplated in different embodiments. In particular embodiments, for instance, methods of controlling airflow in an HVAC unit having a recovery wheel and an economizer include at least an act of operating the economizer when, and only when, outside air enthalpy is less than return air enthalpy, outside air temperature is less than return air temperature, outside air temperature is less than a space temperature set point, outside air temperature is greater than a minimum threshold temperature, outside air dew point is less than a maximum threshold dew point, and outside air dew point is less than return air dew point.

In some embodiments, for example, during unoccupied periods or when outdoor air is not required for ventilation, when the space thermostats are set back to high set points to save energy, or a combination thereof, required cooling can be done with only a small amount of economizer airflow. In some embodiments, for example, during such times, the economizer damper can be used (e.g., only) for cooling, for instance, while leaving the supply fan (e.g., outdoor air supply fan) off in the energy recovery unit to save energy. This can be advantageous, for example, for schools or small offices where there are a high number of unoccupied hours.

In a number of embodiments, an HVAC unit is controlled by a digital controller or computer (e.g., 29 described below). In certain embodiments, at least one computer is used, methods are computer implemented, or both. In various embodiments, methods are tied to particular machines, such as computers that are configured (e.g., programmed with machine-readable instructions) to perform specific tasks or acts described herein. Further, in a number of embodiments, methods are tied specifically to ventilating units, HVAC units, particular types of HVAC units (e.g., having a recovery wheel, economizer, or both), controllers for these particular machines, or a combination thereof, as examples.

It is an aspect of some embodiments that a presentation device presents an operator, for example, with input/output fields for managing the apparatus or method. Various embodiments include a selection means, such as a touch sensitive display, a touch/signature pad, a mouse, or another device that the user or operator can use to make selections, etc. In a number of embodiments, a software tool, computer program, or mobile app, as examples, is used. As mentioned, various embodiments include certain computer-implemented methods, for example, of controlling ventilating or HVAC units or airflow therein, for instance, during operation of the unit. In a number of embodiments, the methods include, for example, in any order, at least certain acts. Further, in various embodiments, such acts include, for instance, acts described herein. Moreover, certain embodiments include acts that take place outside the computer (e.g., outside the controller). For example, some embodiments include an act of controlling at least one aspect of an HVAC system or apparatus, for instance, as described herein.

Various embodiments (e.g., of controllers) include certain apparatuses. Such an apparatus can include, for example, at least one computer or controller that includes machine-readable instructions that, when executed by the computer, perform at least one method described herein or comprising a combination of the acts or steps described herein. In a number of embodiments such instructions specifically configure and adapt the computer or controller to perform such a method, acts, or steps. Certain embodiments include, for example, an apparatus for heating, cooling, ventilating, or a combination thereof, a building. Further, various embodiments of the subject matter described herein include various combinations of the acts, structure, components, and features described herein, shown in the drawings, described in documents that are submitted herewith or incorporated by reference herein, or that are known in the art. Moreover, certain procedures can include acts such as manufacturing, obtaining, or providing components that perform functions described herein or in the documents that are incorporated by reference. The subject matter described herein also includes various means for accomplishing the various functions or acts described herein, in the documents that are submitted herewith or incorporated by reference (if any), or that are apparent from the structure and acts described. Each function described herein is also contemplated as a means for accomplishing that function, or where appropriate, as a step for accomplishing that function.

Various embodiments include, for example, units for ventilating a space within a building. FIG. 1, for example, illustrates preconditioning or energy recovery section 11, economizer collar or section 13, and air conditioning unit (e.g., rooftop unit) or air handler 14. In the embodiment illustrated, energy recovery section 11 and economizer section 13 combine (e.g., in different embodiments, bolt together at the installation site or are integrally manufactured prior to installation) to form energy-recovery and economizer ventilator or module 12. Further, energy-recovery and economizer module 12 is shown combined (e.g., bolted together when energy-recovery and economizer module 12 is installed or integrally manufactured prior to installation) with air handler 14 to form HVAC unit 10. In some embodiments, air handler 14 is an existing air handler or air conditioning unit (e.g., an off-the-shelf commercial air handler or HVAC unit) and energy-recovery and economizer module 12 is added either at installation or later, for example, to reduce energy consumption. Still further, energy-recovery and economizer module 12 and HVAC unit 10 are both examples of units for ventilating a space within a building, for instance, as described herein.

Figure 2:
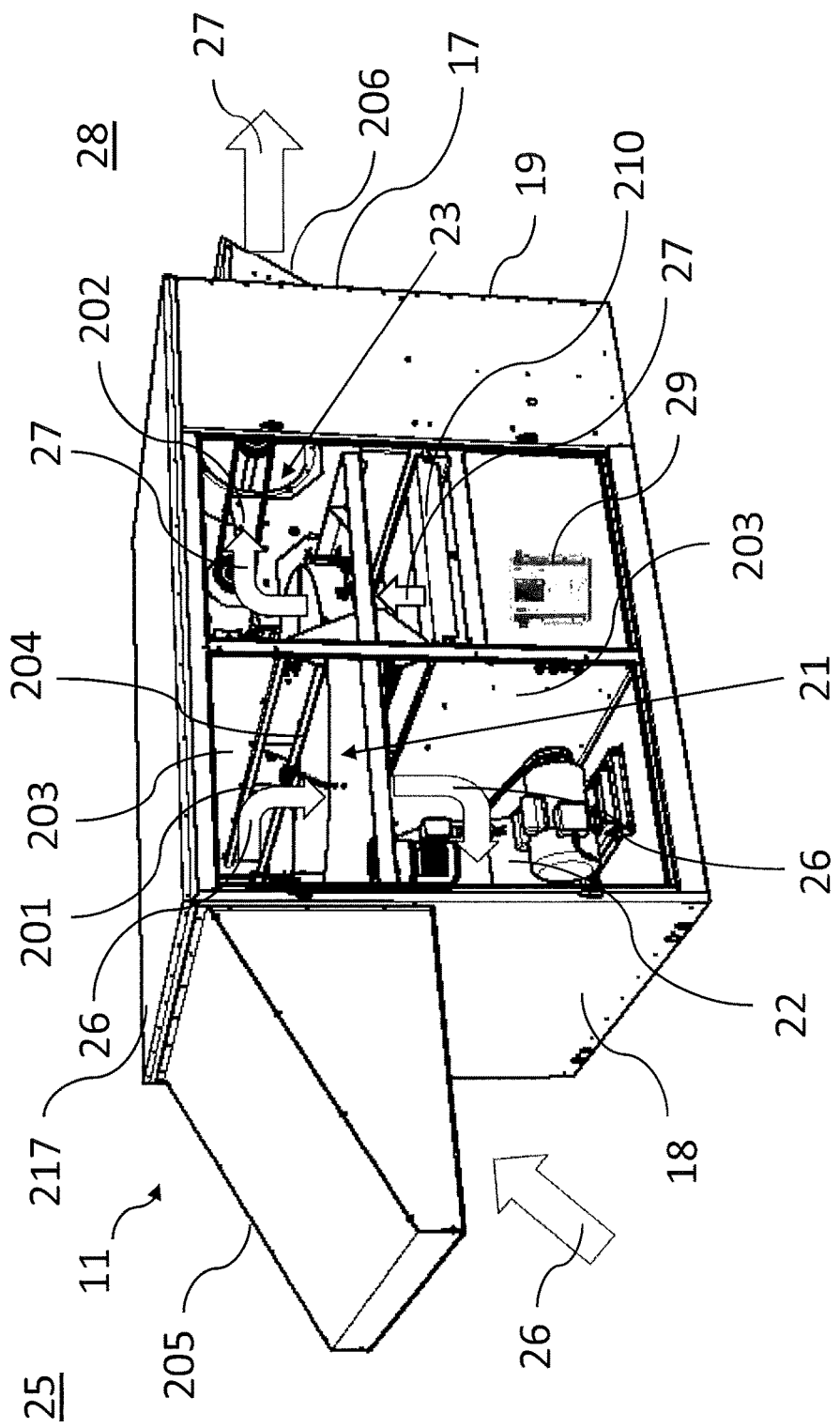
FIG. 2 is an isometric view of the energy recovery section of the energy-recovery and economizer module shown in FIG. 1, with part of one side of the enclosure removed, showing, among other things, the supply air portion, the exhaust air portion, the energy recovery interior wall, the recovery wheel, the energy recovery outdoor air inlet, the outdoor air supply fan, and the exhaust air discharge fan.
Figure 3:
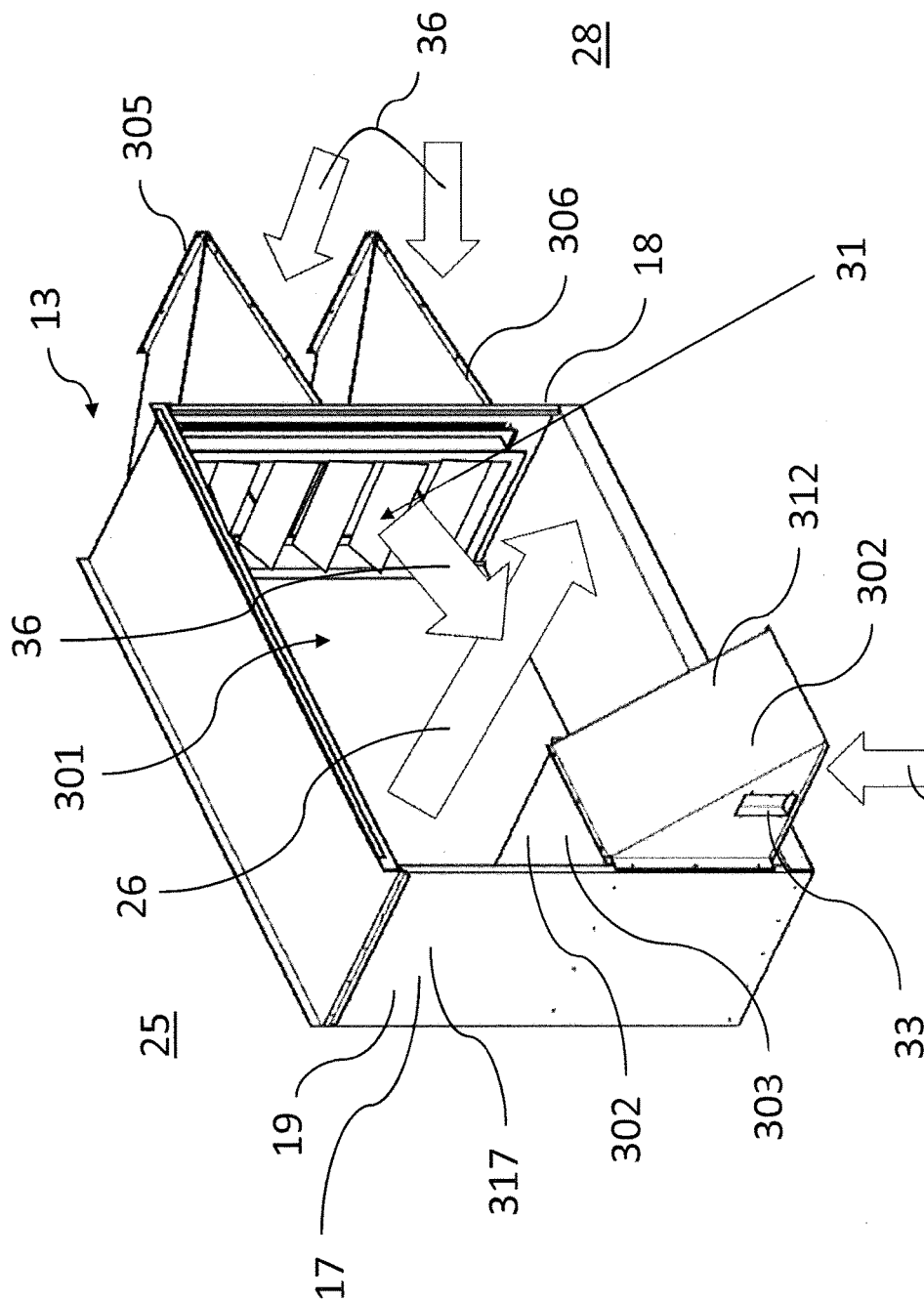
FIG. 3 is an isometric view of the economizer section of the energy-recovery and economizer module of FIG. 1, showing, among other things, the supply air passageway, the exhaust air passageway, the economizer interior wall, two economizer outdoor air inlets, and the economizer damper.
Figure 4:
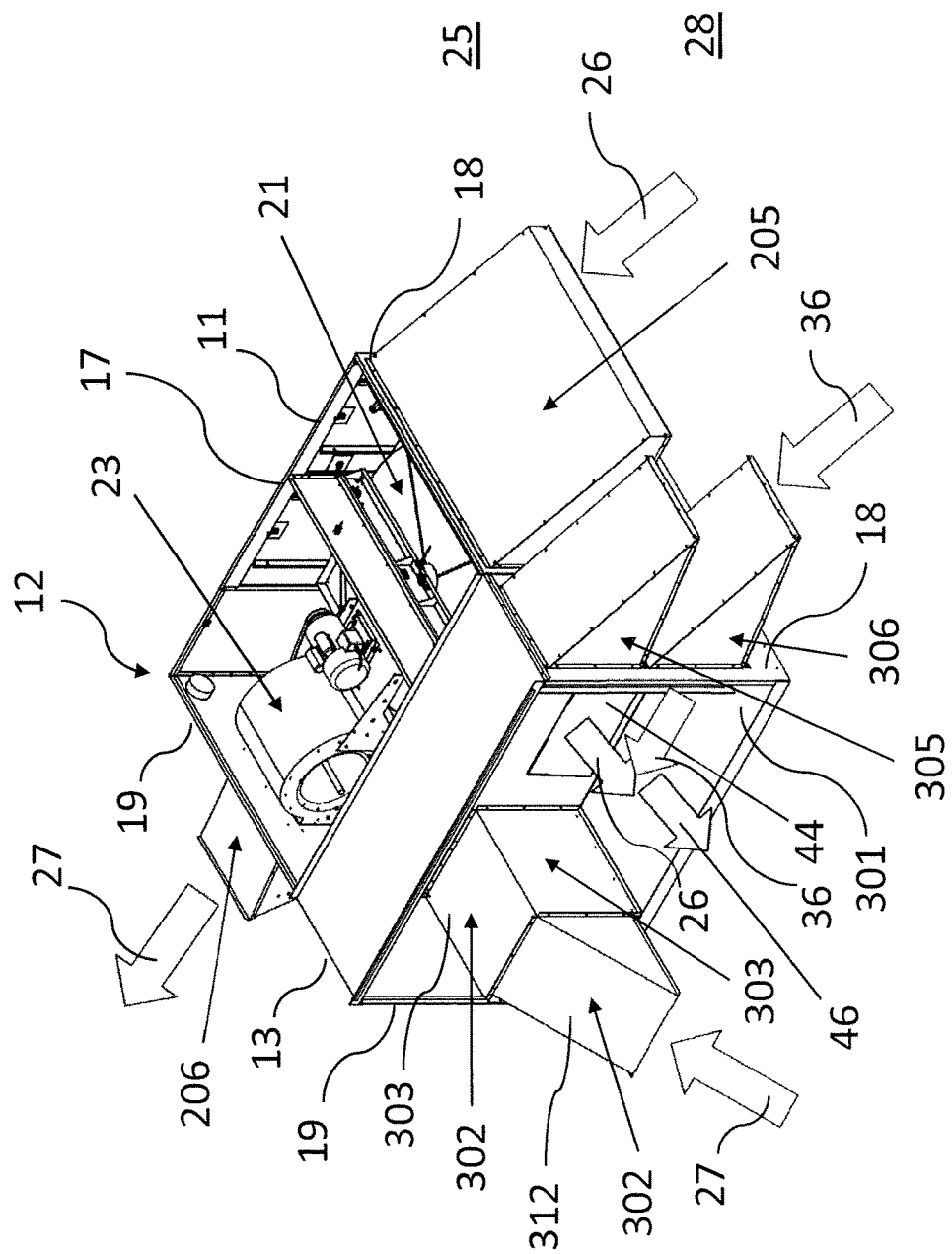
FIG. 4 is an isometric view of the energy recovery section of FIG. 2 and the economizer section of FIG. 3 connected to form the energy-recovery and economizer module of FIG. 1, with the top of the enclosure of the energy recovery section removed, showing, among other things, the recovery wheel, the supply air outlet from the recovery wheel, and the exhaust air discharge fan.
Figure 5:
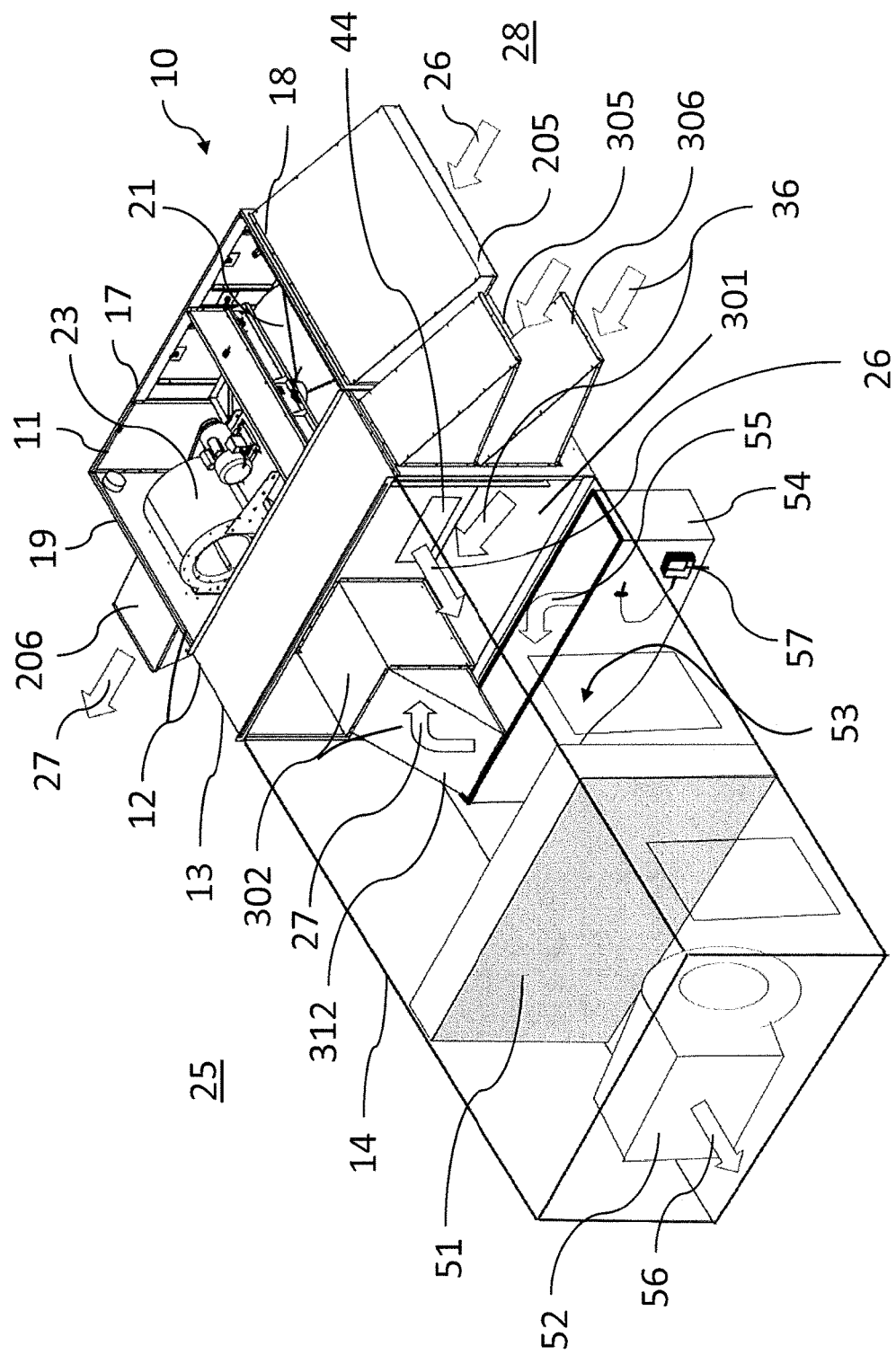
FIG. 5 is an isometric view of the ventilating or HVAC unit of FIG. 1, illustrating the air handler as well as the energy-recovery and economizer module, energy recovery section, and economizer section of FIGS. 2-4, with the top of the enclosure of the energy recovery section removed, and looking through the enclosure around the air handler to see components inside the air handler, this view showing, among other things, the return air plenum and the cooling coil, outdoor air/return air inlet section, and the HVAC supply air fan of the air handler.

Energy recovery section 11 and economizer section 13 are shown separated and in more detail in FIGS. 2 and 3 and are shown assembled (or integral) in FIGS. 4 and 5. Further, in different embodiments, the economizer section (e.g., 13) is configured to be connected to, or is integral with, the energy recovery section (e.g., 11). In a number of embodiments, for instance, an (e.g., ventilating) unit (e.g., module 12 or HVAC unit 10) includes a recovery wheel (e.g., 21 shown in FIGS. 2, 4, and 5), an outdoor air supply fan (e.g., 22 shown in FIG. 2), an economizer damper (e.g., 31 shown in FIG. 3), an exhaust air discharge fan (e.g., 23 shown in FIGS. 2, 4, and 5), or a combination (e.g., all) thereof. Further, various embodiments include a supply air outlet (e.g., 44 shown in FIG. 4) from the recovery wheel (e.g., 21). In a number of embodiments, the outdoor air supply fan (e.g., 22) draws a first stream (e.g., 26 shown in FIGS. 2, 4, and 5) of outdoor air (e.g., 25 shown in FIGS. 2-6) into the unit (e.g., 10 or 12) and moves the first stream (e.g., 26) of the outdoor air (e.g., 25) through the recovery wheel (e.g., 21) to the supply air outlet (e.g., 44). Supply air outlet 44, in the embodiment illustrated, is a passageway or conduit that guides or conveys (e.g., out of energy recovery section 11 and into or through economizer section 13) first stream 26 of outdoor air 25 after first stream 26 passes through recovery wheel 21.

Still further, in a number of embodiments, including the embodiment shown, the economizer damper (e.g., 31) opens to bring a second stream (e.g., 36 shown in FIGS. 3-5) of the outdoor air (e.g., 25) into the supply air outlet (e.g., 44). As used herein, an economizer damper (e.g., 31) "opening to bring a second stream of outdoor air into the supply air outlet" includes bringing the second stream into a passageway or conduit (e.g., supply air passageway 301 shown in FIG. 3) that guides or conveys outdoor air (e.g., first stream 26) after that air (e.g., first stream 26) passes through the recovery wheel (e.g., 21). In other words, in this particular context, the supply air outlet (e.g., 44) includes the supply air passageway (e.g., 301) that extends through the economizer section (e.g., 13). In various embodiments, the economizer damper (e.g., 31) opens to bring the second stream (e.g., 36) of the outdoor air (e.g., 25) to form a combined outdoor airstream (e.g., stream 46 shown in FIG. 4) leaving the energy recovery and economizer module (e.g., 12) and entering the outdoor air/return air inlet section (e.g., 53 shown in FIG. 5) of the HVAC unit or air handling section (e.g., 14). Even further, in various such embodiments, the exhaust air discharge fan (e.g., 23) moves exhaust air (e.g., 27 shown in FIGS. 2, 4, and 5), for example, from the space within the building, through the recovery wheel (e.g., 21), and blows the exhaust air (e.g., 27) out of the unit (e.g., 10 or 12) to outdoors (e.g., 28).

In some such embodiments, the unit is an energy-recovery and economizer module (e.g., 12) for connection to, and operation with, a packaged air handling unit, air handling section, or air handler (e.g., 14, for example, existing or new off the shelf). In other embodiments, however, the unit (e.g., 10) includes (e.g., is integral with) the packaged air handler (e.g., 14). In various embodiments, for example, the packaged air handler (e.g., 14 shown in FIG. 1) includes at least one cooling coil (e.g., 51 shown in FIG. 5) and an air handler supply fan (e.g., 52 shown in FIG. 5) that moves supply air (e.g., 56 shown in FIG. 5) first through the cooling coil (e.g., 51) and then to the space. In different embodiments, cooling coil 51 can be, for example, cooled with refrigerant (e.g., an evaporator in a direct expansion system coil) or can be a chilled water cooling coil (e.g., in a system with chillers) as examples.

Further, in a number of embodiments, the unit (e.g., 10 or 12) includes one enclosure (e.g., 17), for example, containing (i.e., at least) the recovery wheel (e.g., 21), the economizer damper (e.g., 31), the outdoor air supply fan (e.g., 22), and the exhaust air discharge fan (e.g., 23). Still further, in a number of such embodiments, the one enclosure (e.g., 17) is assembled, for instance, either at an installation site (e.g., bolted or screwed together) or prior to installation of the unit (e.g., from sheet metal). In some embodiments, the one enclosure (e.g., 17) includes an energy recovery enclosure (e.g., 217 shown in FIG. 2) at least substantially enclosing the energy recovery section (e.g., 11) and a separate economizer enclosure (e.g., 317 shown in FIG. 3) substantially enclosing the economizer section (e.g., 13). As used herein, "substantially enclosing" means enclosing, except where other sections or components connect, and except for penetrations such as inlets (e.g., 205, 305, and 306) and outlets (e.g., 206 and 44), and except for minor air leakage. As used herein, leakage is considered to be minor if it totals less than 5 percent of a total airflow from which the leakage occurs. Still further, in some such embodiments, the energy recovery enclosure (e.g., 217) and the economizer enclosure (e.g., 317) are assembled (e.g., bolted together) at the installation site, for instance, when the unit (e.g., 10 or 12) is installed (e.g., to form all or part of enclosure 17).

In various embodiments, the energy recovery outdoor air inlet (e.g., 205), which, in the embodiment illustrated, is a hood and the exhaust air outlet (e.g., 206) (e.g., also shown as a hood), penetrate or are external to the energy recovery enclosure (e.g., 217). In addition, in the embodiment shown, the economizer outdoor air inlet (e.g., 305 and 306 shown as vertically oriented hoods) penetrate or are external to the economizer enclosure (e.g., 317). In particular embodiments, the one enclosure (e.g., 17) consists essentially of a single enclosure assembled prior to installation of the unit (e.g., 10, 12, or 72 described below). Further, in certain embodiments, the one enclosure (e.g., 17) includes one common energy-recovery and economizer module (e.g., 12 or 72) enclosure assembled prior to installation of the unit. In comparison, in some embodiments, the one enclosure (e.g., 17) consists essentially of multiple enclosures (e.g., 217 and 317 for module 12) that are connected together at installation. Still further, in various embodiments, the one enclosure (e.g., 17) at least substantially encloses the energy recovery section (e.g., 11) and the economizer section (e.g., 13).

In particular integrated embodiments, the unit (e.g., 10) includes, for example, within the one enclosure (e.g., 17) at least one cooling coil (e.g., 51) and the air handler supply fan (e.g., 52) that moves supply air (e.g., 56) first through the cooling coil (e.g., 51) and then to the space. In a number of embodiments, this supply air (e.g., 56) includes (e.g., at least) a first portion (e.g., 55 shown in FIG. 5) of return air from the space and (e.g., at least one of) the first stream (e.g., 26) or the second stream (e.g., 36) of the outdoor air (e.g., 25), or both the first stream (e.g., 26) and the second stream (e.g., 36). For example, in a number of embodiments, the supply air (e.g., 56) includes the first portion (e.g., 55) of return air from the space and the first stream (e.g., 26) of the outdoor air (e.g., 25), when the economizer damper (e.g., 31) is closed. Moreover, in various embodiments, when the economizer damper is open, the supply air (e.g., 56) further includes the second stream (e.g., 36) of the outdoor air (e.g., 25). Further, in various embodiments, the exhaust air (e.g., 27) that exits the unit through the exhaust air discharge fan (e.g., 23) is a second portion (e.g., all other than the first portion) of the return air from the space. Further, in this embodiment, when the economizer damper (e.g., 31) is open, the first stream (e.g., 26) and the second stream (e.g., 36) of the outdoor air (e.g., 25) combine in the supply air passageway (e.g., 301 shown in FIG. 3) that extends through the economizer section (e.g., 13) to form a combined stream (e.g., 46 shown in FIG. 4) of the outdoor air (e.g., 25) that is then combined with the first portion (e.g., 55) of return air from the space, which is, in a number of embodiments, cooled by the (e.g., at least one) cooling coil (e.g., 51) and moved by the air handler supply fan (e.g., 52) and becomes the supply air (e.g., 56) that is delivered to the space.

In a number of such embodiments, the air handler supply fan (e.g., 52) and the outdoor air supply fan (e.g., 22) both operate (i.e., run, at least during some modes of operation) when the economizer damper (e.g., 31) is open. As used herein, "open", when referring to a damper, means at least partially open. In a number of such embodiments, operating the outdoor air supply fan (e.g., 22) when the economizer damper (e.g., 31) is open allows a smaller economizer damper to be used, and in some embodiments, at least in particular modes of operation, can allow some of the outdoor air (e.g., stream 26) to be treated by the recovery wheel (e.g., 21) while the economizer damper (e.g., 31) is at least partially open. Further, in some embodiments, delivering airflow (e.g., 26) through the energy recovery section (e.g., 11) during economizer mode (e.g., when economizer damper 31 is open) also minimizes the length of the economizer section (e.g., 13). In the embodiment shown in FIGS. 1 and 5, for example, the "length of the economizer section" is the distance between, air handler 14 and energy recovery section 11. In particular embodiments, minimizing the length of the economizer section (e.g., 13) can allow the energy recovery and economizer module (e.g., 12) to bolt onto the (e.g., packaged) air handler (e.g., 14) without the need for an additional structural curb.

In certain embodiments, however, a larger economizer damper (e.g., 31) can be used, or less total outdoor air (e.g., stream 26 plus stream 36) can be supplied (e.g., at least under certain conditions), and the outdoor air supply fan (e.g., 22) can be turned off when the economizer damper (e.g., 31) is open (e.g., partially or fully, in different embodiments). Further, in some embodiments, the outdoor air supply fan (e.g., 22) can be turned off when a certain percentage of outdoor air is demanded but can be turned on when more outdoor air is demanded as well as when economizer damper (e.g., 31) is closed. In many embodiments, under most conditions, exhaust airflow (e.g., 27) is a fraction of total outdoor air (e.g., stream 26 plus stream 36), for instance, 50 to 80 percent, when the economizer damper (e.g., 31) is open.

In various embodiments, there is significantly more pressure drop in the return air registers and ductwork than the slight positive pressure of the building, so the supply air passageway (e.g., 301) extending through the economizer section (e.g., 13) is at a (e.g., very low) negative pressure relative to the outdoors (e.g., 28), at least when the economizer damper (e.g., 31) is open, even when the outdoor air supply fan (e.g., 22) is operating. This (e.g., very low) negative pressure within the supply air passageway (e.g., 301) pulls outdoor air (e.g., stream 26 or outdoor air 25) through the economizer damper (e.g., 31). In various embodiments, the pressure drop in the return air registers and ductwork is greater than the pressure drop across the economizer damper (e.g., 31) when the economizer damper is fully open, resulting in most of the supply air delivered to the air handler supply fan (e.g., 52) being outdoor air (e.g., stream 26, 36, or both). Further, in a number of embodiments, since opening the economizer damper (e.g., 31) increases the inlet pressure supplied to the air handler supply fan (e.g., 52) the flow (e.g., 56) of the air handler supply fan increases. In some embodiments, for example, the outdoor air (e.g., streams 26 and 36) delivered to the air handler supply fan (e.g., 52) when the economizer damper (e.g., 31) is fully open equals, approximately equals, or even exceeds the airflow rate (e.g., 56) of the air handler supply fan (e.g., 52) when the economizer damper (e.g., 31) is fully closed. In various embodiments, this is true even though the air handler supply fan (e.g., 52) draws some return air (e.g., 55, for example, from return air plenum 54) when the economizer damper (e.g., 31) is fully open and therefore the airflow rate (e.g., 56) of the air handler supply fan (e.g., 52) when the economizer damper (e.g., 31) is fully open is greater than the airflow rate of the air handler supply fan (e.g., 52) when the economizer damper (e.g., 31) is fully closed.

As mentioned, in various embodiments, the unit (e.g., 10 or 12) includes, for example, within the one enclosure (e.g., 17), an energy recovery section (e.g., 11) and an economizer section (e.g., 13). Referring to FIG. 2, in certain embodiments, the energy recovery section (e.g., 11) includes a supply air portion (e.g., 201), an exhaust air portion (e.g., 202), and an energy recovery interior wall (e.g., 203) separating the supply air portion (e.g., 201), from the exhaust air portion (e.g., 202). A number of embodiments have an opening (e.g., 204) in the energy recovery interior wall (e.g., 203) and the recovery wheel (e.g., 21) extends through the opening (e.g., 204) in the energy recovery interior wall (e.g., 203). Thus, in various embodiments, the recovery wheel (e.g., 21) is located partially in the supply air portion (e.g., 201) and partially in the exhaust air portion (e.g., 202). Still further, some such embodiments include an energy recovery outdoor air inlet (e.g., 205), for example, connected to the supply air portion (e.g., 201). In the embodiment illustrated, energy recovery outdoor air inlet 205 is an inlet hood, for example. Further, in other embodiments, there are more than one energy recovery outdoor air inlet or hood, for example, 2, 3, 4, or 5.

Even further, in a number of embodiments, the energy recovery section (e.g., 11) includes the outdoor air supply fan (e.g., 22). In various embodiments, for example, the outdoor air supply fan (e.g., 22) is located in the supply air portion (e.g., 201), of the energy recovery section (e.g., 11) and draws the first stream (e.g., 26) of the outdoor air (e.g., 25) into the supply air portion (e.g., 201) through the energy recovery outdoor air inlet (e.g., 205). Further still, in various embodiments, the outdoor air supply fan (e.g., 22) moves the first stream (e.g., 26) of the outdoor air through the recovery wheel (e.g., 21) within the supply air portion (e.g., 201). Even further still, a number of embodiments of an energy recovery section (e.g., 11) includes an exhaust air outlet (e.g., 206), for instance, a (e.g., high-velocity) discharge hood, for example, connected to the exhaust air portion (e.g., 202). Moreover, a number of embodiments of an energy recovery section (e.g., 11) include the exhaust air discharge fan (e.g., 23), for instance, located in the exhaust air portion (e.g., 202), of the energy recovery section (e.g., 11). In various embodiments, the exhaust air discharge fan (e.g., 23) moves the exhaust air (e.g., 27) through the recovery wheel (e.g., 21), for example, within the exhaust air portion (e.g., 202). Furthermore, in a number of embodiments, the exhaust air discharge fan (e.g., 23) blows the exhaust air (e.g., 27) out of the energy recovery section (e.g., 11), for example, through the exhaust air outlet (e.g., 206).

Further, in a number of embodiments, the economizer section (e.g., 13 shown in FIGS. 1 and 3-5) includes a supply air passageway (e.g., 301), for instance, extending through the economizer section (e.g., 13), an exhaust air passageway (e.g., 302), for instance, extending through the economizer section (e.g., 13) and an economizer interior wall (e.g., 303) separating the supply aft passageway (e.g., 301) from the exhaust air passageway (e.g., 302). Still further, in various embodiments, the economizer section (e.g., 13) includes an (e.g., at least one) economizer outdoor air inlet (e.g., 305 and 306 shown) for example, connected to the supply air passageway (e.g., 301). In the embodiment shown, economizer outdoor air inlets 305 and 306 are hoods, for example. In different embodiments, there can be 1, 2, 3, 4, 5, or more economizer outdoor air inlets, as examples.

Further still, in a number of embodiments, the economizer section (e.g., 13) includes the economizer damper (e.g., 31 shown in FIG. 3). Even further, in various embodiments, and as shown, the economizer damper (e.g., 31) is between the (e.g., at least one) economizer outdoor air inlet (e.g., 305 and 306 shown) and the supply air passageway (e.g., 301). In a number of embodiments, when the economizer damper (e.g., 31) is open, the second stream (e.g., 36) of the outdoor air is allowed to enter the supply air passageway (e.g., 301) through the at least one economizer outdoor air inlet (e.g., 305 and 306), and through the economizer damper (e.g., 31), and when the economizer damper (e.g., 31) is closed, the outdoor air is substantially prevented, by the economizer damper (e.g., 31), from entering the supply air passageway (e.g., 301) through the at least one economizer outdoor air inlet (e.g., 305 or 306). As used herein, "substantially prevented", when referring to air, means that at least 95 percent of the air is prevented (e.g., from entering without passing through). Moreover, in a number of embodiments, when the economizer damper (e.g., 31) is closed, the outdoor air is substantially prevented, by the economizer damper (e.g., 31), from entering the supply air passageway (e.g., 301) without passing through the recovery wheel (e.g., 21). In other words, in the embodiment shown, when economizer damper 31 is closed, second stream 36 is zero or near zero, for instance, except for leakage through closed damper 31. In some embodiments, the economizer damper (e.g., 31) has a leakage rate of less than 3 cfm per square foot of damper area at 1" of pressure differential across the damper, for example.

In various embodiments, the one enclosure (e.g., 17) at least substantially encloses the energy recovery section (e.g., 11) and the economizer section (e.g., 13). Moreover, in a number of embodiments, the energy recovery outdoor air inlet (e.g., 205), the exhaust air outlet (e.g., 206), and the (e.g., at least one) economizer outdoor air inlet (e.g., 305 and 306) each penetrate the one enclosure (e.g., 17). Further, in a number of embodiments, when the unit (e.g., 10 or 12) is assembled for operation, or at least when the economizer section (e.g., 13) is connected to, or integral with, the energy recovery section (e.g., 11), the supply air passageway (e.g., 301), extending through the economizer section (e.g., 13) connects to the supply air portion (e.g., 201) in the energy recovery section (e.g., 11). Still further, in a number of embodiments, the exhaust air passageway (e.g., 302), extending through the economizer section (e.g., 13) connects to the exhaust air portion (e.g., 202) in the energy recovery section (e.g., 11). Even further, in a number of embodiments, when the unit (e.g., 10 or 12) is assembled for operation, or at least when the economizer section (e.g., 13) is connected to, or integral with, the energy recovery section (e.g., 11), the supply air passageway (e.g., 301), extending through the economizer section (e.g., 13) connects to, or is part of, the supply air outlet (e.g., 44 shown in FIG. 4) from the recovery wheel (e.g., 21).

In various integrated embodiments, the unit (e.g., 10) further includes for example, within the one enclosure (e.g., 17), an air handling section (e.g., air handler 14), for instance, that includes at least one cooling coil (e.g., 51) and an air handler supply fan (e.g., 52) that moves supply air (e.g., 56) first through the cooling coil (e.g., 51) and then to the space. Moreover, in a number of embodiments, when the unit (e.g., 10) is assembled for operation (e.g., as shown in FIGS. 1 and 5), the economizer section (e.g., 13) is between (e.g., as shown) the energy recovery section (e.g., 11) and the air handling section (e.g., 14). Still further, in some embodiments, the energy-recovery and economizer module (e.g., 12) is configured so that when the energy-recovery and economizer module is connected to and operated with the packaged air handler (e.g., 14), the economizer section (e.g., 13) is between the energy recovery section (e.g., 11) and the packaged air handler (e.g., 14).

Even further, in a number of embodiments that include at least one cooling coil (e.g., 51) and an air handler supply fan (e.g., 52) that moves supply air (e.g., 56) first through the cooling coil (e.g., 51) and then to the space, when the unit (e.g., 10) is assembled and operating (e.g., as shown in FIG. 1), the supply air passageway (e.g., 301), for instance, extending through the economizer section (e.g., 13) connects to an outdoor air/return air inlet section (e.g., 53 shown in FIG. 5) of the air handling section (e.g., 14). Even further still, in a number of embodiments, the exhaust air passageway (e.g., 302), for instance, extending through the economizer section (e.g., 13) connects (e.g., via return air scoop 312 shown in FIGS. 3-6) to a return air plenum (e.g., 54 shown in FIG. 5) serving the air handling section (e.g., 14). In some embodiments, one or more return air sensors (e.g., 33) are located within the return air scoop (e.g., 312), for example, to measure one or more parameters such as temperature and humidity, of the return air (e.g., that becomes exhaust air 27).

In various embodiments, the outdoor air (e.g., stream 26, or 26 and 36 depending on whether economizer damper 31 is open) from (e.g., at least one of) the recovery wheel (e.g., 21) or the economizer damper (e.g., 31) becomes the supply air (e.g., 56). Further still, in various embodiments, the economizer section (e.g., 13) is configured to be connected to the packaged air handler (e.g., 14), for example, such that the supply air passageway (e.g., 301) extending through the economizer section (e.g., 13) connects to an outdoor air/return air inlet section of the packaged air handler (e.g., 14), the exhaust air passageway (e.g., 302) extending through the economizer section (e.g., 13) connects to a return air plenum (e.g., 54) serving the packaged air handler (e.g., 14), or both. In this context, as used herein, in this context, "configured" means sized and arranged to fit together, for example, without intervening ductwork.

Moreover, in various embodiments, when the unit (e.g., 10 or 12) is assembled (e.g., as shown in FIG. 1), the one enclosure (e.g., 17) includes an inlet side (e.g., 18) that has the energy recovery outdoor air inlet (e.g., 205) and the economizer outdoor air inlet (e.g., 305 and 306 shown), and an outlet side (e.g., 19) that has the exhaust air outlet (e.g., 206). In a number of embodiments, as shown, the inlet side (e.g., 18) is opposite the outlet side (e.g., 19). In various embodiments, separating the outdoor air inlets (e.g., 205, 305, and 306) from the exhaust air outlet (e.g., 27) on opposite sides (e.g., 18 and 19) of the unit reduces or prevents recirculation of exhaust air into the outdoor air inlets. Further, in some embodiments the outlet (e.g., 206) directs the exhaust away or substantially away from the inlets (e.g., 205, 305, and 306) or from the module (e.g., 12) or unit (e.g., 10 or 12). As used herein, directing away means within 10 degrees of directly away and directing substantially away means within 30 degrees from directly away. Further still, in a number of embodiments, the outlet (e.g., 27) is a high-velocity hood, which can move the exhaust air farther away from the unit, module, or inlet hoods. These aspects can reduce recirculation or reintroduction of exhausted contaminants back into the occupied space within the building through the inlets (e.g., 205, 305, and 306) or inlet air streams (e.g., 26, 36, or both). Such recirculation or reintroduction of exhausted contaminants back into the occupied space could otherwise reduce indoor air quality, require more outdoor air (e.g., 26) to maintain a satisfactory level of indoor air quality, or both.

Figure 6:
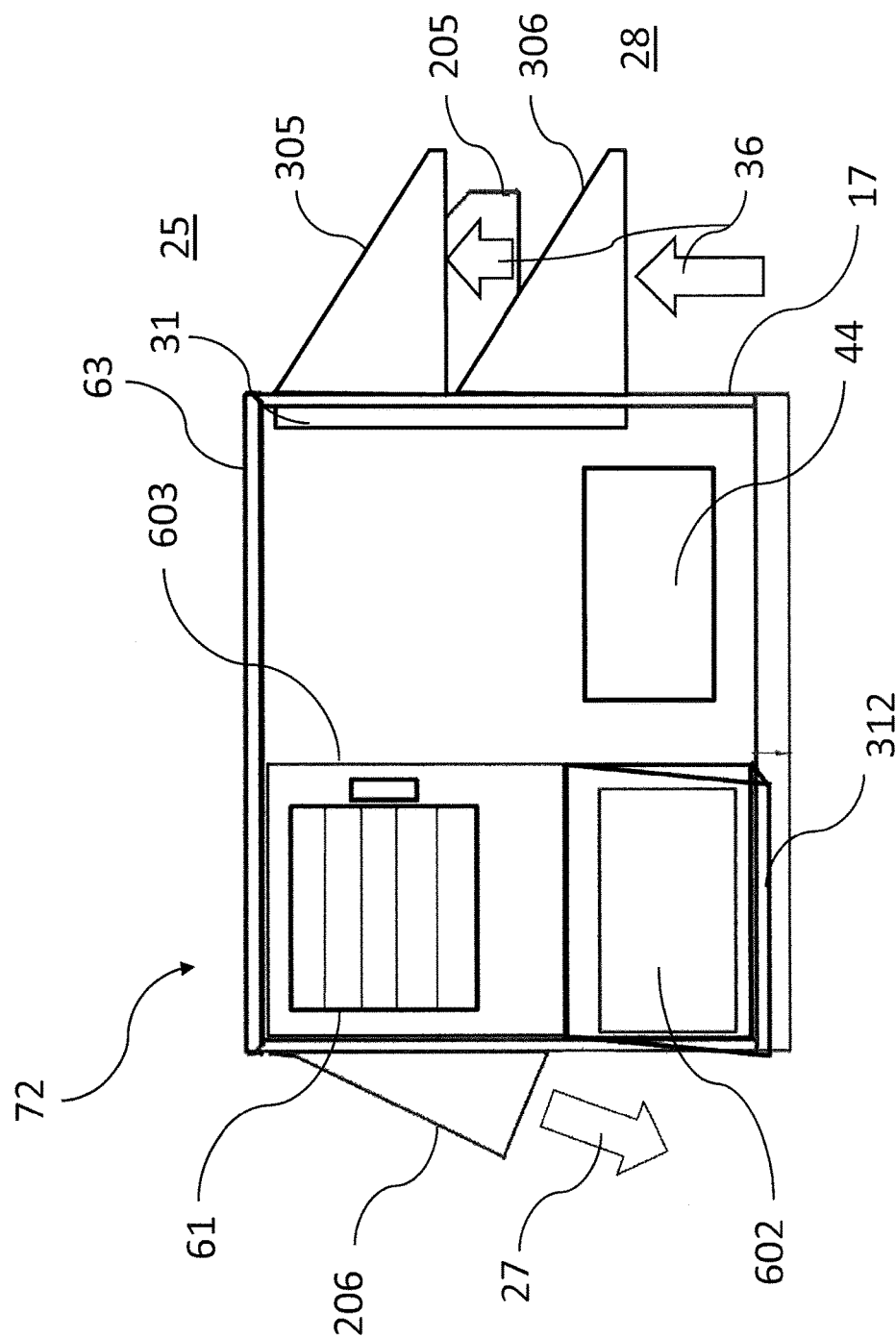
FIG. 6 is a side view of an alternate embodiment of an economizer section, this alternate embodiment comprising a power exhaust bypass damper shown in this view that opens to allow exhaust air to exit the unit through the exhaust air discharge fan in the energy recovery section without passing through the recovery wheel, wherein this alternate embodiment of an economizer section can be substituted for the economizer section shown in FIG. 3 and combined and used with the air handler and energy recovery sections of FIGS. 1, 2, 4, and 5.
Figure 7:
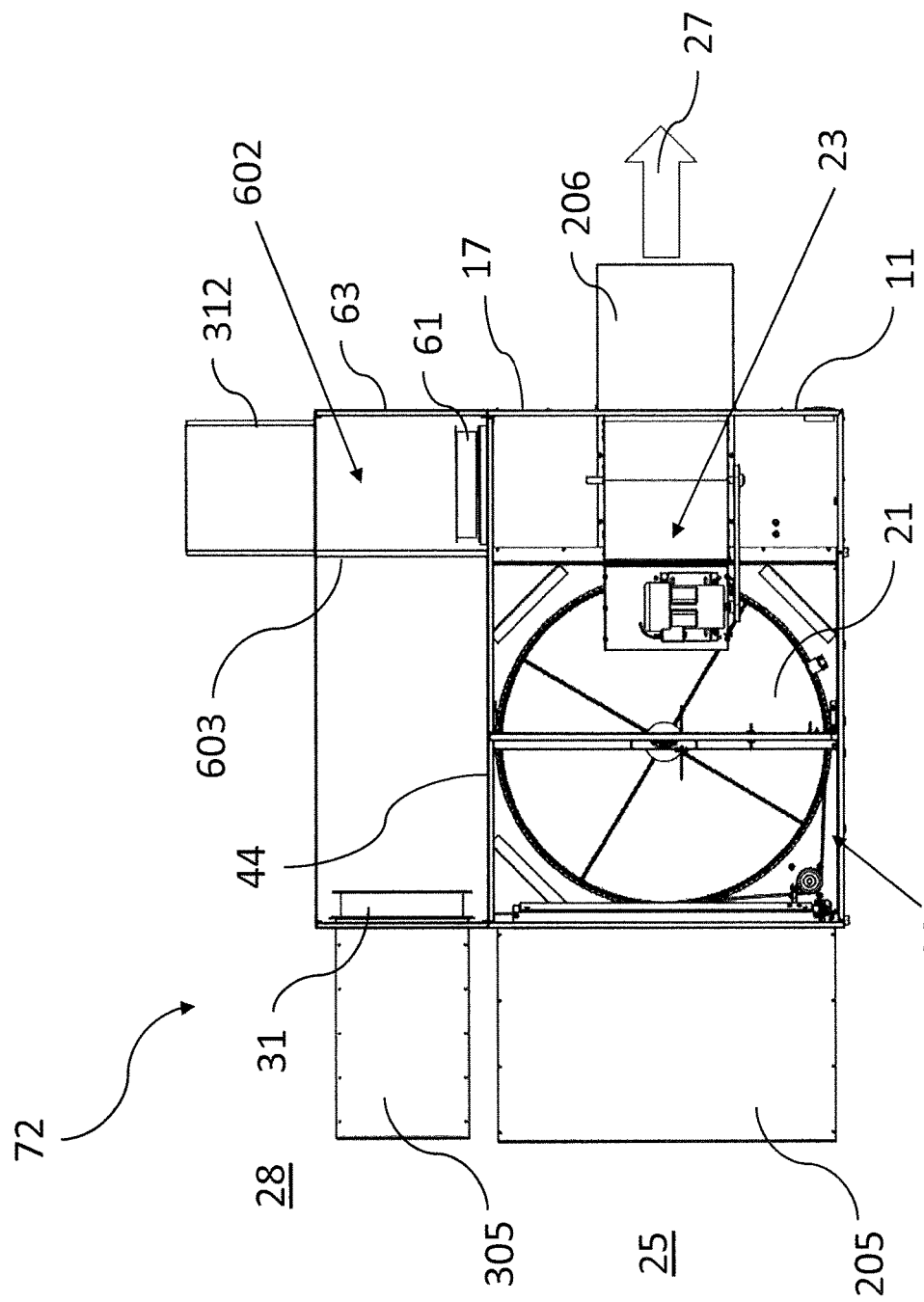
FIG. 7 is a top view, with the top of the enclosure removed, of the alternate embodiment of the economizer module of FIG. 6 connected to the energy recovery section of FIGS. 1, 2, 4, and 5, forming an alternate embodiment of an energy recovery and economizer module that can be substituted for the energy recovery and economizer module of FIGS. 1, 2, and 5, and that can be connected to, and used with, the air handler of FIGS. 1 and 5.

FIGS. 6 and 7 illustrate an alternate embodiment of an economizer section, economizer section 63, that can be substituted for economizer section 13 described herein. Various embodiments, including economizer section 63, further include a power exhaust bypass damper (e.g., 61 shown in FIGS. 6 and 7), for example, that opens to allow at least part of the exhaust air (e.g., 27) to exit the unit (e.g., 10 or 12, except with economizer 63 substituted for economizer section 13) through the exhaust air discharge fan (e.g., 23) without passing through the recovery wheel (e.g., 21). In a number of embodiments, when the power exhaust bypass damper (e.g., 61) is closed, return air from the return air plenum (e.g., 54) serving the ventilating unit (e.g., 10 or 72) is substantially prevented from exiting the exhaust air passageway (e.g., 602) through the exhaust air outlet (e.g., 206) without passing through the recovery wheel (e.g., 21).

In various embodiments, the power exhaust bypass damper (e.g., 61) opens to relieve static pressure across the exhaust air (e.g., 27) side of the energy recovery wheel (e.g., 21) and return air filters (e.g., 210 shown in FIG. 2) and lowers the power consumption of the exhaust air discharge fan (e.g., 23) for that airflow (e.g., 27), increases the airflow (e.g., 27), or a combination thereof. In a number of embodiments the strategically placed bypass damper (e.g., 61) in the exhaust air passageway (e.g., 602) in the economizer section (e.g., 13), or in other embodiments, in the exhaust air portion of the recovery section or the exhaust fan compartment, allows the existing exhaust fan (e.g., 23) to operate at a much higher airflow (e.g., of stream 27), for example, without changing the fan speed or installed HP by simply removing the static pressure associated with the recovery wheel (e.g., 21), filters (e.g., 210) and system losses. In some embodiments, however, the speed of the exhaust air discharge fan (e.g., 23) is, or can be, changed (e.g., increased) during economizer operation (e.g., when economizer damper 31 is open), when power exhaust bypass damper 61 is open, or both.

In a number of such embodiments, for example, the power exhaust bypass damper (e.g., 61) is between the exhaust air discharge fan (e.g., 23) and the exhaust air passageway (e.g., 602, which essentially provides the functionality of 302 but has a different shape). In the embodiment illustrated, exhaust air passageway 602 extends through economizer section 63 as shown in FIG. 7. In various embodiments, when the power exhaust bypass damper (e.g., 61) is open, return air from the return air plenum (e.g., 54 shown in FIG. 5) serving the unit (e.g., 10 or 12 except with economizer section 63) is allowed to exit the exhaust air passageway (e.g., 602) through the power exhaust bypass damper (e.g., 61), through the exhaust air discharge fan (e.g., 23), and through the exhaust air outlet (e.g., 206), for example, without passing through the recovery wheel (e.g., 21).

In FIG. 7, energy recovery section 11 (e.g., shown in FIGS. 1, 2, 4, and 5) and economizer section 63 combine (e.g., are bolted together or are integrally manufactured) to form energy-recovery and economizer module 72, which is similar to energy-recovery and economizer module 12 shown in FIGS. 1, 4, and 5 except for power exhaust bypass damper 61 and certain illustrated accommodations for damper 61 such as the shape of exhaust air passageway 602 and economizer interior wall 603 shown in FIGS. 6 and 7 in comparison with exhaust air passageway 302 and economizer interior wall 303 shown in FIGS. 3 and 4. FIG. 6 shows energy-recovery and economizer module 72, from the side that contains economizer section 63, with energy recovery section 11 in the background with energy recovery outdoor air inlet 205 and exhaust air outlet 206 visible, energy recovery outdoor air inlet 205 being partially behind the economizer outdoor air inlets 305 and 306. As shown in FIGS. 6 and 7, economizer interior wall 603, in the embodiment illustrated, is entirely vertical and extends from bottom to top of economizer section 63, whereas economizer interior wall 203 is partially vertical and partially horizontal and does not extend to the top of economizer section 13.

As used herein, unless stated otherwise, economizer dampers (e.g., 31) and power exhaust bypass dampers (e.g., 61) are power operated dampers that open and close automatically under the direction of a controller (e.g., 29). In some embodiments, the economizer damper (e.g., 31), the power exhaust bypass damper (e.g., 61) where so equipped, or both, are adjusted incrementally to control or modulate flow, while in other embodiments, one or both of these dampers is normally only stopped in a fully open or fully closed position. In some such embodiments, fan speed of one or more fans (e.g., 22, 23, 52, or a combination thereof) is used to control one or more airflow rates (e.g., stream 36, 27, or both), for example, under the direction of controller 29. In various embodiments, the outdoor air supply fan (e.g., 22) has a first variable-speed drive, the exhaust air discharge fan (e.g., 23) has a second variable-speed drive, the recovery wheel (e.g., 21) has a third variable-speed drive, or a combination thereof, as examples. Further, in a number of embodiments, the power exhaust bypass damper (e.g., 61) is modulated to control building static pressure, for instance, when the economizer damper (e.g., 31) is at least partially open, speed of the exhaust air discharge fan (e.g., 23) is modulated to control building static pressure, for example, when the power exhaust bypass damper (e.g., 61) is open, or both. Still further, in some embodiments, a controller (e.g., 29, for instance, a DDC controller or control board) in (or on, in other embodiments) the energy recovery section (e.g., 11) controls the economizer damper (e.g., 31) in the economizer section (e.g., 13). In some embodiments, the unit (e.g., 10 or 12) or controller (e.g., 29) includes a display, for example, displaying the airflow rate of outdoor air being delivered to the space (e.g., 26, 36, or both).

In a number of embodiments, the recovery wheel (e.g., 21) is a total energy recovery wheel and transfers humidity as well as heat, for example, with a (e.g., anti-microbial) desiccant coating. Further, in various embodiments, the recovery wheel (e.g., 21) does not transfer a high percentage of indoor contaminants back to the occupied space via the desiccant coating. In some embodiments there are exhaust or return air filters (e.g., 210 shown in FIG. 2) that the power exhaust bypass damper (e.g., 61) bypasses in addition to the recovery wheel (e.g., 21). Such return air filters (e.g., 210) may, for example, protect the recovery wheel (e.g., 21) from contamination from particulate contaminants produced within the building, but, in some embodiments, it may be permissible to discharge such particulates to the outdoors (e.g., 28). In some embodiments, the pressure drop across the return air filters can be significant, for example, almost as much as the pressure drop across the recovery wheel (e.g., 21). Some embodiments use a self-cleaning fluted media, for example (e.g., for recovery wheel 21). This can, for example, allow a lower-restriction filter to be used, which can reduce fan energy (e.g., of exhaust air discharge fan 23 when bypass damper 61 is closed and energy recovery wheel 21 is in operation). Even with such features to reduce pressure drop, however, pressure drop across the recovery wheel and filters can be significant. By avoiding the pressure drop through the recovery wheel, and in many embodiments, return air filters (e.g., 210), the power exhaust bypass damper (e.g., 61) can be used (i.e., opened) to increase exhaust flow (e.g., 27) and avoid building over-pressurization during economizer operation (e.g., when economizer damper 31 is open), for example, when the recovery wheel (e.g., 21) is not being used.

In a number of embodiments, the space or building is maintained at a slight positive pressure (e.g., 0.05"), for example, to limit the infiltration into the space or building of moisture under warm and humid conditions, or cold air under cold conditions, as examples. Increasing outdoor airflow into the building through the economizer (e.g., adding second stream 36 to first stream 26 in economizer section 13), however, can over-pressurize the building. In various embodiments, the power exhaust bypass damper (e.g., 61) is opened to avoid over-pressurizing the building, for example, when the economizer damper (e.g., 31) is at least partially open. Further, in various embodiments, the power exhaust bypass damper (e.g., 61) is closed to use, or increase effectiveness of, the recovery wheel (e.g., 21), for instance, when the economizer damper (e.g., 31) is closed.

Still further, in a number of embodiments, the power exhaust bypass damper (e.g., 61) is modulated to control building static pressure, for instance, when the economizer damper (e.g., 31) is at least partially open. For example, in some embodiments, the power exhaust bypass damper (e.g., 61) is modulated to maintain an appropriate level of building static pressure or to avoid over-pressurization of the building. As used herein, a damper is being modulated when the damper is set at a position between fully open and fully closed and small adjustments of the damper are made (e.g., controlled by controller 29) to control a parameter (e.g., air flow, pressure, ratio of air flows, etc.). Such small adjustments can be made, for example, when needed to control the parameter, which can be evaluated (e.g., by controller 29) periodically or continuously, as examples. Even further, in some embodiments, speed of the exhaust air discharge fan (e.g., 23 shown in FIG. 7) is modulated to control building static pressure when the power exhaust bypass damper (e.g., 61) is open. In a number of embodiments where speed of the exhaust air discharge fan (e.g., 23) is modulated to control building static pressure when the power exhaust bypass damper (e.g., 61) is open, the power exhaust bypass damper (e.g., 61) is either fully closed or fully open depending on whether the recovery wheel (e.g., 21) is being used or depending on whether the exhaust damper (e.g., 31) is open. In a number of embodiments, for example, building static pressure is modulated (e.g., under the control of controller 29) based on a signal from a building static pressure transducer or sensor (e.g., 57 shown in FIG. 5).

In various embodiments, the unit (e.g., 10, 12, or 72) is operated without a return air damper, for example, restricting flow of return air from the space to the air handler supply fan (e.g., 52), for instance, at the return air plenum (e.g., 54). Various embodiments eliminate the need for a traditional return air damper. Further, some embodiments, reduce fan energy efficiency, and a number of embodiments (e.g., of energy-recovery and economizer module 12) can be bolted to a new or existing air handler or HVAC unit (e.g., 14). Various embodiments use a separate outdoor air fan (e.g., 22, separate from fan 52) to reduce parasitic fan energy consumption compared to a single fan system employing energy recovery (e.g., an energy recovery wheel) and a return air damper. A number of embodiments efficiently deliver the desired amount of outdoor air (e.g., 26, 36, or both) even when the air handler supply fan (e.g., 52) is modulated, for instance, in a variable air volume (VAV) system (e.g., air handler 14).

In a number of embodiments, by using the fan in the energy recovery unit (e.g., 22) to deliver a portion of the outdoor air at a slight negative pressure (e.g., relative to outdoors 28) to the return air section (e.g., 53) of the rooftop unit (e.g., 14) and delivering the rest of the economizer outdoor air through the economizer damper (e.g., 31) with a very low pressure loss, the return air damper is no longer needed. In contrast, if a return air damper is used for economizer operation, during normal operation, the overall fan horsepower is typically greater since the supply fan (e.g., 52) in the rooftop unit (e.g., 14) needs to drag the air though the wheel, filters, etc., (typically more than 1.5") and this pressure will almost always be greater than the pressure required to pull the return air through the ductwork (typically 0.5"). As a result, the system supply fan (e.g., 52) needs to be sized to handle the full airflow at the higher of the two static pressures. This is not the case with various embodiments of the present invention.

Further, in a number of embodiments, the unit (e.g., 10, 12, or 72) is operated without a return air damper restricting flow of return air while delivering the second stream (e.g., 36) of the outdoor air through the economizer damper (e.g., 31) and the first stream (e.g., 26) of the outdoor air through the recovery wheel (e.g., 21). Further still, in various embodiments, the first stream (e.g., 26) and the second stream (e.g., 36) of the outdoor air combine in the unit to provide a combined stream (e.g., 46) of the outdoor air (e.g., 25) to the space. In some embodiments, during maximum economizer flow, this combined stream (e.g., 46) of the outdoor air is 100 percent or approximately 100 percent of the design airflow rate (e.g., of supply air 56) of the air handler (e.g., 14) or supply fan (e.g., 52). Moreover, in some embodiments (e.g., having power exhaust bypass damper 61), this combined stream (e.g., 46) of the outdoor air, when the economizer damper (e.g., 31) is fully open, is 100 percent or approximately 100 percent of a volumetric flow rate of the air handler (e.g., 14) supply fan (e.g., 52) when the unit (e.g., 10) is operated with the economizer damper (e.g., 31) closed. As used herein, "approximately" means to within plus or minus 10 percent.

In a number of embodiments, the unit (e.g., 10, 12, or 72) does not include, or is operated without, a return air damper, for example, that is modulated to control a ratio of return air from the space to outdoor air (e.g., stream 26, 36, or both) that combine in the unit to become supply air (e.g., 56) that is delivered to the space. Even further, in various embodiments, the unit (e.g., 10, 12, or 72) or module (e.g., 12 or 72) operates without a return air damper, for instance, that is modulated to regulate return air entering the packaged air handler (e.g., 14) through the return air plenum (e.g., 54). Various prior art HVAC systems with energy recovery wheels that had the ability to provide outdoor air have not been able to deliver 100 percent outdoor airflow or approximately 100 percent outdoor airflow during economizer operation due to increased static pressure loss associated, for example, with the recovery wheel, filters, intake hood, dampers, etc.

In certain embodiments, at least one dew point, at least one enthalpy, or both, are used to determine whether to open the economizer damper (e.g., 31). Further, a number of embodiments include a controller (e.g., 29 shown in FIG. 2) that controls (e.g., among other things) the economizer damper (e.g., 31). Still further, in a number of embodiments the controller (e.g., 29) controls speed of the recovery wheel (e.g., 21), mechanical cooling (e.g., delivered via cooling coil 51), or both. Even further, in some embodiments, the controller (e.g., 29) controls the economizer damper (e.g., 31), recovery wheel (e.g., 21) speed, mechanical cooling (e.g., one or more compressors or chilled water supplying cooling coil 51), or a combination thereof, for instance, based on measured parameters. In some cases, for instance, these measured parameters can be measured directly, while in other cases, the parameters can be calculated, for example, from other measurements. Various measured or determined parameters, in a number of embodiments, include outdoor air temperature; outdoor air humidity, enthalpy, or dew point; space or return air temperature; space or return air humidity, enthalpy, or dew point; or a combination thereof. Further still, in particular embodiments, the controller (e.g., 29) further controls, as examples, the economizer damper (e.g., 31), speed of the recovery wheel (e.g., 21), mechanical cooling (e.g., one or more compressors or chilled water supplying cooling coil 51), or a combination thereof, for instance, based on desired supply air (e.g., 56) temperature (e.g., another measured or determined parameter), for example, leaving the air handling section (e.g., 14) that contains the mechanical cooling (e.g., cooling coil 51).

Certain embodiments are an HVAC unit (e.g., 10) that includes an air conditioning unit (e.g., air handler 14 with cooling coil 51), a recovery wheel (e.g., 21), an economizer section (e.g., 13), an outdoor air supply fan (e.g., 22), and various controls (e.g., controller 29). In a number of embodiments, for example, the air conditioning unit (e.g., 14) includes an air handler supply fan (e.g., 52), mechanical cooling (e.g., cooling coil 51, one or more compressors or chilled water supplying cooling coil 51, or both), and an air inlet (e.g., outdoor air/return air inlet section 53 shown in FIG. 5). Further, in various embodiments, the recovery wheel (e.g., 21) has a supply air outlet (e.g., 44), for example, connected to the air inlet (e.g., 53) of the air conditioning unit (e.g., 14). Still further, in a number of such embodiments, the economizer section (e.g., 13) includes an economizer damper (e.g., 31), for instance, that opens to introduce outdoor air (e.g., 25, for instance, second stream 36), for example, into the supply air outlet (e.g., 44) or between the supply air outlet (e.g., 44) of the recovery wheel (e.g., 21) and the air inlet (e.g., 53) of the air conditioning unit (e.g., 14). As used herein, introducing outdoor air "between the supply air outlet of the recovery wheel and the air inlet of the air conditioning unit" includes, (e.g., in the embodiment illustrated), introducing the outdoor air into the supply air passageway (e.g., 301 shown in FIG. 3) that guides or conveys the outdoor air (e.g., first stream 26) after that air (e.g., first stream 26) passes through the recovery wheel (e.g., 21).

Even further, in various embodiments, the outdoor air supply fan (e.g., 22) is separate from the air handler supply fan (e.g., 52). As used herein, where multiple components are identified with different names in the same embodiment, the multiple components are separate components unless indicated otherwise herein or clearly otherwise. Even further still, in a number of these embodiments, the controls (e.g., controller 29) control the economizer damper (e.g., 31), speed of the recovery wheel (e.g., 21), the mechanical cooling (e.g., one or more compressors or chilled water supplying cooling coil 51, for instance, a chilled water valve position), or a combination thereof. In a number of embodiments, the air handler supply fan (e.g., 52) and the outdoor air supply fan (e.g., 22) both operate when the economizer damper (e.g., 31) is open. Further, in various embodiments, the HVAC unit (e.g., 10) includes an exhaust air discharge fan (e.g., 23), for instance, that moves exhaust air from the space within the building that the unit serves through the recovery wheel (e.g., 21), and, in a number of embodiments, blows the exhaust air (e.g., 27) out of the HVAC unit (e.g., 10) to outdoors (e.g., 28). Still further, in particular embodiments, such HVAC units (e.g., 10) include any applicable combination of other components described herein for ventilating units (e.g., 10 or 12), including, in various embodiments, various components of the energy recovery section (e.g., 11), economizer section (e.g., 13), supply air portion (e.g., 201), exhaust air portion (e.g., 202), supply air passageway (e.g., 301), exhaust air passageway (e.g., 302 or 602), interior walls (e.g., 203, 303, or 603), and inlets (e.g., 205, 305, and 306) and outlets (e.g., 44, 206).

In a number of embodiments, the exhaust air discharge fan (e.g., 23) is used (i.e., operated), for example, while the power exhaust bypass damper (e.g., 61) is closed, to move the exhaust air (e.g., 27) through the recovery wheel (e.g., 21) and the exhaust air discharge fan (e.g., 23) is used, while the power exhaust bypass damper (e.g., 61) is open, and, in various embodiments, while the economizer damper (e.g., 31) is open, for example, to provide power exhaust, for instance, to reduce static pressure within the space. Moreover, in various embodiments, the return air from the space (e.g., through return air plenum 54) is divided into a first portion (e.g., 55) that forms part of the supply air (e.g., 56) and a second portion that exits the unit as the exhaust air (e.g., 27) through the exhaust air discharge fan (e.g., 23). In some embodiments, the second portion (e.g., 27) is larger than the first portion (e.g., 55) when the economizer damper (e.g., 31) is open. In different embodiments, for example, the second portion (e.g., 27) is larger than the first portion (e.g., 55) by a factor of 1.25, 1.5, 2, 3, 4, 5, 6, 7, 8, 9, 10, 12, or 52, as examples, when the economizer damper (e.g., 31) is (e.g., fully) open. On the other hand, in some embodiments, the first portion (e.g., 55) is larger than the second portion (e.g., 27) when the economizer damper (e.g., 31) is closed. In different embodiments, for example, the first portion (e.g., 55) is larger than the second portion by a factor of 1.25, 1.5, 2, 3, 4, 5, 6, 7, 8, 9, 10, 12, or 52, as examples, when the economizer damper (e.g., 31) is (e.g., fully) closed. Further, in some embodiments, when the economizer damper (e.g., 31) is closed, and the power exhaust bypass damper (e.g., 61) is closed, the second portion of the return air (e.g., 27) that exits the unit as the exhaust air (e.g., through exhaust air discharge fan 23) is less than half of the first portion (e.g., 55) of the return air that forms part of the supply air (e.g., 56).

Figure 8:
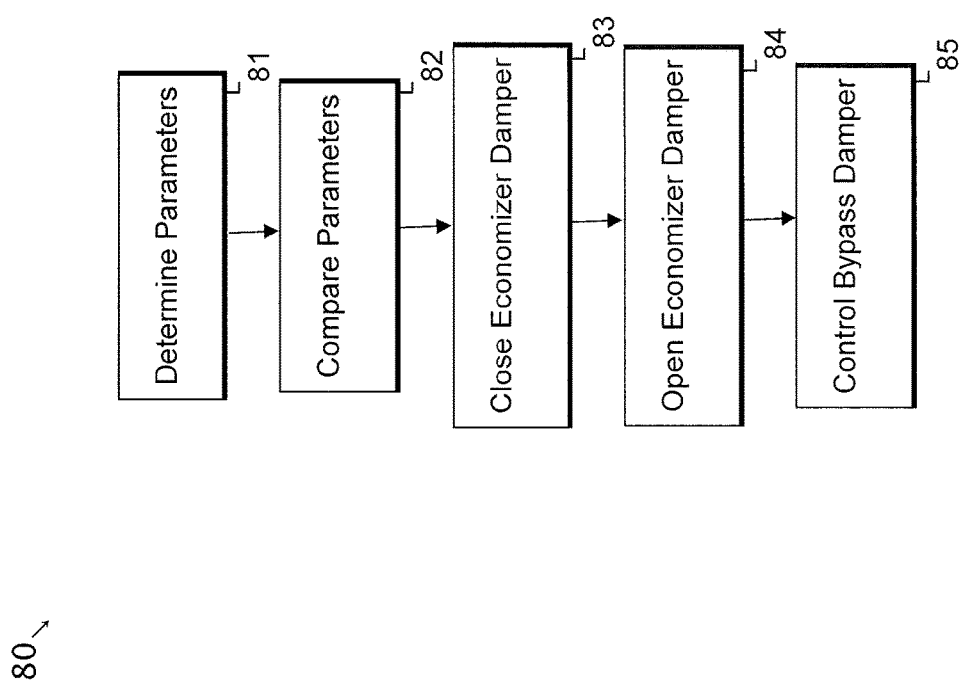
FIG. 8 is a flow chart that illustrates, among other things, an example of a method of controlling airflow in an HVAC unit having a recovery wheel and an economizer when a space served by the HVAC unit is calling for cooling.

Still other specific embodiments include various methods, for example, of controlling airflow in an HVAC unit (e.g., 10) having a recovery wheel (e.g., 21) and an economizer, for example, when a space served by the HVAC unit (e.g., 10) is calling for cooling. FIG. 8 illustrates an example of such a method, method 80. Method 80 includes act 81 of determining (e.g., measuring, calculating, inputting, reading, or a combination thereof) parameters, act 82 of comparing (e.g., those) parameters, act 83 of closing the economizer damper (e.g., 31), act 84 of opening the economizer damper (e.g., 31), and act 85 of controlling or modulating (e.g., opening or closing) the bypass damper (e.g., power exhaust bypass damper 61). In a number of embodiments, acts 83, 84, and 85 are controlled based on parameter comparisons made in act 82. Different embodiments include some or all of the acts of method 80. In particular, some embodiments omit act 85 (e.g., embodiments that do not have a power exhaust bypass damper, such as shown in FIGS. 3-5).

Method 80 is computer implemented, in a number of embodiments, for instance, by controller 29. In some embodiments, for example, controller 29 includes software or computer readable instructions, that, when executed, perform some or all of the acts of method 80. In a number of embodiments, method 80 is repeated, for example, periodically, continuously, when one or more of the parameters changes, or a combination thereof. In a single iteration of method 80, act 83 of closing the economizer damper is performed, act 84 of opening the economizer damper is performed, or neither act 83 nor act 84 is performed, for example, based on a comparison made in act 82 in that comparison. In many embodiments, however, acts 83 and 84 are not both performed in the same iteration of method 80.

In some embodiments, acts 81 and 82 of method 80 are implemented (e.g., by controller 29) upon an initial call for cooling (e.g., from a thermostat in the space), for example, before energizing the compressors. In some such embodiments, acts 81 and 82 of method 80 are implemented to determine if cooling can be accomplished with "free cooling" using increased quantities of outdoor air, for example, by opening the economizer damper (e.g., 31 in act 84) or, on the other hand, whether energy recovery should be employed, for example, by closing (or keeping closed) the economizer damper (e.g., 31 in act 83). In some embodiments, in act 84, the controller (e.g., 29) locks out the compressor(s) (e.g., leaves them off) and the economizer damper (e.g., 31) is modulated (e.g., by controller 29), for instance, to obtain the desired supply air set point (e.g., 55 degrees) or remains fully open until satisfying the space thermostat setting. In some embodiments (e.g., in act 84), the controller (e.g., 29) allows the compressors to energize if (e.g., only if) the space cannot be cooled with the outdoor air (e.g., 36 and 26) sufficiently to satisfy the space thermostat setting.

In a number of embodiments, for example, a method (e.g., 80) includes (e.g., at least partially) opening (e.g., act 84) an economizer damper (e.g., 31) in the economizer (e.g., section 13 or 63) to bring in more than a minimum ventilation requirement of outdoor air (e.g., 25). This minimum ventilation requirement of outdoor air can be required by a code or standard or can be required to meet an indoor air quality code or standard or to provide the outdoor air quantity needed to satisfy a desired occupied space carbon dioxide level, for instance, as measured by a $CO_2$ sensor, as examples. Various embodiments include modulating a position of the economizer damper (e.g., 31) to maintain a supply air temperature set point (e.g., 55 degrees) when a first set of conditions exist. This first set of conditions includes, in various embodiments, outdoor air (e.g., 25) enthalpy being less than return air (e.g., in return air plenum 54) enthalpy or outdoor air dew point being less than return air dew point. Further, in some embodiments, this first set of conditions includes (e.g., in addition) outdoor air temperature being less than return air temperature, the outdoor air temperature being greater than a minimum threshold temperature set point, or both.

In some embodiments, the economizer damper is opened (e.g., in act 84) to a particular position based, for example, on the (e.g., real time) supply air temperature relative to the supply air temperature set point. Further, in some embodiments, the economizer damper is opened (e.g., in act 84) a small amount in each iteration of method 80 where more economizer air is demanded, until no more economizer air is demanded. Similarly, in some embodiments, the economizer damper is closed a small amount in each iteration of method 80 where less economizer air is demanded, until no less economizer air is demanded. In some embodiments, parameters other than set point supply air temperature, such as space temperature, supply or return air humidity, enthalpy, or dew point, or a combination thereof, can be used to determine whether to incrementally open or close the economizer damper or control other variables such as fan speed, mechanical cooling, recovery wheel operation, etc.

Moreover, in a number of embodiments, the method (e.g., 80) includes closing (e.g., act 83) the economizer damper (e.g., 31), and providing energy recovery with the recovery wheel (e.g., 21), when a second set of conditions exists. Unless indicated otherwise, as used herein, the economizer damper (e.g., 31) is fully closed when energy recovery is being provided in act 83. In some embodiments, when conditions are outside of the economizer window (e.g., window 95 shown in FIG. 9), and act 83 is implemented, the recovery wheel (e.g., 21) is operated at full speed for maximum energy recovery unless frost control, available in particular embodiments, is required, which reduces recovery wheel speed sufficiently to avoid frost formation on the recovery wheel (e.g., 21). This second set of conditions includes, in various embodiments, the outdoor air (e.g., 25) enthalpy being greater than the return air (e.g., 55 or in return air plenum 54) enthalpy, the outdoor air temperature being greater than the return air temperature, or the outdoor air dew point being greater than a maximum threshold dew point set point. Further, in some embodiments, this second set of conditions includes (e.g., in addition) the outdoor air dew point being greater than the return air (e.g., 55) dew point. Still further, in a number of embodiments, the method (e.g., 80) includes closing (e.g., act 83) the economizer damper (e.g., 31) and providing energy recovery with the recovery wheel (e.g., 21) when the outdoor air temperature is less than the minimum threshold temperature set point (e.g., regardless whether the second set of conditions exists).

In a number of embodiments, the method (e.g., 80) further includes determining (e.g., in act 81): the outdoor air (e.g., 25) enthalpy, the return air (e.g., 55 or in return air plenum 54) enthalpy, the outdoor air dew point, the return air dew point, the outdoor air temperature, the return air temperature, the minimum threshold temperature set point, the maximum threshold dew point set point, or a combination thereof. These parameters or conditions can be determined, for example, by measurement or by calculation from measurements, or in the case of set points, by reading inputs from an operator, for example, inputs stored in memory of controller 29. Further, in various embodiments, the method (e.g., 80) includes comparing (e.g., in act 82): the outdoor air (e.g., 25) enthalpy to the return air (e.g., 55) enthalpy, the outdoor air dew point to the return air dew point, the outdoor air temperature to the return air temperature, the outdoor air temperature to the minimum threshold temperature set point, the outdoor air dew point to the maximum threshold dew point set point, or a combination thereof. In a number of embodiments, parameters determined in act 81 are compared in act 82 (e.g., by controller 29, for instance, in real time) to determine whether to perform act 83 of closing the economizer damper (e.g., 31) or act 84 of opening the economizer damper, for instance, at a particular time, or maintaining the current position of the economizer damper.

Figure 9:
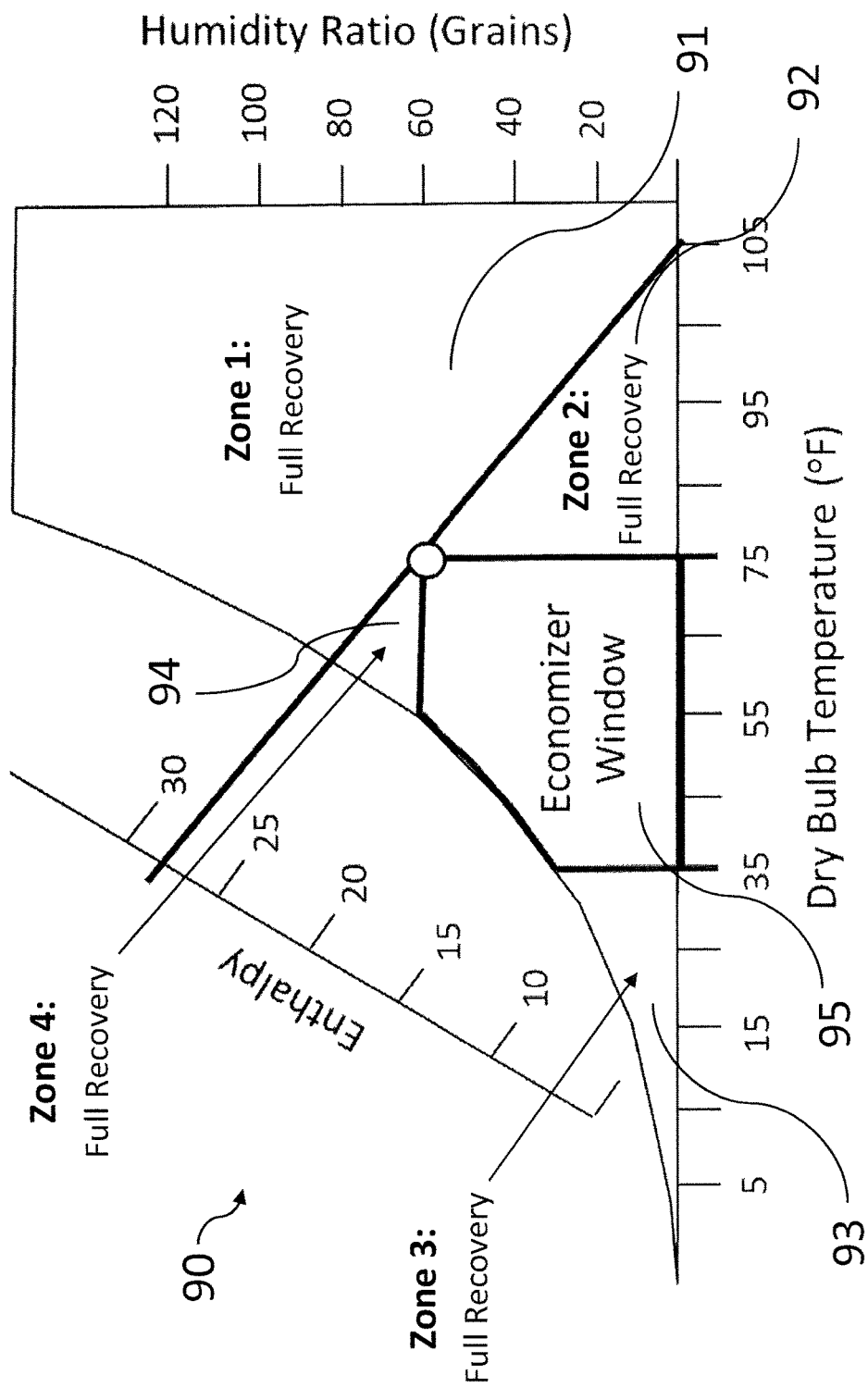
FIG. 9 is psychometric chart illustrating examples of four zones of full recovery and an economizer window which can be used to determine when to use an economizer in an HVAC system, for example, in conjunction with the method illustrated by FIG. 8.

In a number of embodiments, the method (e.g., 80) or control logic (e.g., of controller 29) enables economizer operation (e.g., opening of economizer damper 31 or act 84) unless operating conditions fall into one of four lockout zones. Examples of such lockout zones are shown in FIG. 9 on psychometric chart 90. Zone 1 or 91 on FIG. 9 is when outdoor air (e.g., 25) enthalpy (H) is greater than the return air (e.g., 55) enthalpy. In this situation, in various embodiments, full total energy recovery is used (e.g., in act 83), for example, for precooling and dehumidification. Zone 2 or 92 is when outdoor air temperature is greater than the return air temperature. In this situation, in various embodiments, full total energy recovery is used (e.g., in act 83), for example, to precool the outdoor air (e.g., stream 26).

Zone 3 or 93 on psychometric chart 90 is when outdoor air (e.g., 25) temperature is below the (e.g., field adjustable) outdoor low ambient setting (e.g., input by the operator or default 35 degrees F.). In this situation, in various embodiments, full total energy recovery is used (e.g., in act 83), for example, and the economizer is locked out (e.g., economizer damper 31 is closed or kept closed) to avoid dumping of cold air (e.g., stream 36) into the space. Finally, Zone 4 or 94 is when outdoor air dew point (X) is greater than both the return air (e.g., 55) dew point and the space humidity dew point set point (e.g., default 55 degrees F. or as input by the operator). In this situation, in various embodiments, full total energy recovery is used (e.g., in act 83), for example, to dehumidify the incoming outdoor air (e.g., 26) and raise the compressor sensible heat ratio to maintain the desired space humidity conditions. Economizing (e.g., opening economizer damper 31) during these conditions (e.g., 91-94) may satisfy the space thermostat yet may raise the space humidity to an unacceptably high level.

Still further, in a number of embodiments, the method (e.g., 80) includes controlling (e.g., act 85), for instance, opening, a power exhaust bypass damper (e.g., 61), for example, to allow exhaust air (e.g., 27) to exit the HVAC unit (e.g., 10) to outdoors (e.g., 28) without passing through the recovery wheel (e.g., 21). In a number of embodiments, act 85 of controlling bypass damper can include opening, closing, or both (e.g., incrementally or fully), the bypass damper (e.g., power exhaust bypass damper 61), for instance, based on measured building static pressure, parameters determined in act 81 or compared in act 82, position of the economizer damper (e.g., 31) fan speed (e.g., of exhaust air discharge fan 202), or a combination thereof, as examples.

In some embodiments, the method (e.g., 80) includes controlling or opening (e.g., 85) the power exhaust bypass damper (e.g., 61), for example, to reduce building static pressure, for instance, when the economizer damper (e.g., 31) is at least partially open (e.g., opened in act 84). Further, in certain embodiments, the method (e.g., 80) includes closing (e.g., in act 85) the power exhaust bypass damper (e.g., 61), for example, to increase effectiveness of the recovery wheel (e.g., 21), for instance, when the economizer damper (e.g., 31) is closed (e.g., in act 83). Still further, in a number of embodiments, the method (e.g., 80) includes controlling building static pressure based on a signal from a building static pressure sensor (e.g., 57). Even further, in some embodiments, the method (e.g., 80) includes modulating (e.g., in act 85) the power exhaust bypass damper (e.g., 61), for example, to control building static pressure, for instance, when the economizer damper (e.g., 31) is at least partially open.

Further still, some embodiments include modulating speed of an exhaust air discharge fan (e.g., 23) to control building static pressure, for example, when the power exhaust bypass damper (e.g., 61) is open (e.g., fully open). Various methods are performed without a return air damper, for example, that throttles return air from the space (e.g., returning through return air plenum 54) served by the HVAC unit (e.g., 10). In a number of embodiments, this return air (e.g., first portion shown in FIG. 5) combines in the HVAC unit (e.g., 10 or 14) with the outdoor air (e.g., streams 26 and 36) from at least one of the recovery wheel (e.g., 21) or the economizer damper (e.g., 31) to become supply air (e.g., 56) that is delivered to the space (e.g., after passing through air handler supply fan 52 and cooling coil 51).

Further, in certain embodiments, a method includes controlling speed of the recovery wheel (e.g., 21), mechanical cooling (e.g., one or more compressors or chilled water supplying cooling coil 51), or both, for example, based on certain parameters. These parameters can include, for example, outdoor air temperature, outdoor air humidity, enthalpy, or dew point, space or return air temperature, space or return air humidity, enthalpy, or dew point, or a combination thereof. Still further, in a number of embodiments, a method includes controlling (e.g., speed of) an outdoor air supply fan (e.g., 22), controlling (e.g., speed of) an air handler supply fan (e.g., 52), or both. Further still, in various embodiments, a method includes controlling (e.g., speed of, for instance, with controller 29) an exhaust air discharge fan (e.g., 23) that moves exhaust air through the recovery wheel (e.g., 21) and blows the exhaust air (e.g., 27) out of the unit (e.g., 10, 12, or 72), or a combination thereof. Even further, in particular embodiments, the method includes controlling an air handler supply fan (e.g., 52) that moves supply air (e.g., 56) first through a cooling coil (e.g., 51) and then to the space.

What is claimed is:

1. A unit for ventilating a space within a budding, the unit comprising:
    a recovery wheel;
    an energy recovery outdoor air inlet into the unit from outdoors;
    a supply air outlet from the recovery wheel, wherein the supply air outlet includes a supply air passageway;
    an outdoor air supply fan that draws a first stream of outdoor air into the unit from the outdoors through the energy recovery outdoor air inlet and moves the first stream of the outdoor air through the recovery wheel to the supply air outlet;
    at least one economizer outdoor air inlet into the unit from the outdoors;
    a modulating economizer damper that opens to bring a second stream of the outdoor air into the unit from the outdoors, wherein:
        the economizer damper is between the at least one economizer outdoor air inlet and the supply air outlet;
        when the economizer damper is open, the second stream of the outdoor air is allowed to enter the supply air outlet from the outdoors through the at least one economizer outdoor air inlet, without passing through the recovery wheel;
        when the economizer damper is open, the economizer damper is modulated to maintain a supply air temperature set point;
        when the economizer damper is open, the unit is operated without the need for a return air damper to regulate or modulate flow of return air from the building in order to have the desired amount of outdoor air; and
        when the economizer damper is closed, the outdoor air is substantially prevented from entering the supply air outlet from the outdoors through the at least one economizer outdoor air inlet; and
    an exhaust air discharge fan that moves exhaust air from the space through the recovery wheel and blows the exhaust air out of the unit to the outdoors, wherein, when the economizer damper is open, building static pressure is controlled by controlling powered exhaust airflow of the exhaust air discharge fan.

2. The unit of claim 1 wherein the unit is an energy-recovery and economizer module for connection to, and operation with, a packaged air handler comprising at least one cooling coil and an air handler supply fan that moves supply air first through the cooling coil and then to the space.

3. The unit of claim 2 wherein, when the economizer damper is fully open, the first stream of the outdoor air and the second stream of the outdoor air combine in the unit to provide a combined steam of the outdoor air to the space that is approximately 100 percent of a flow rate of the air handler supply fan when the unit is operated with the economizer damper closed.

4. The unit of claim 1 further comprising one enclosure containing the recovery wheel, the economizer damper, the outdoor air supply fan, and the exhaust air discharge fan, wherein:
    the one enclosure is assembled either at an installation site or prior to installation of the unit;
    the energy recovery outdoor air inlet penetrates the one enclosure and the outdoor air supply fan draws the first stream of the outdoor air into the one enclosure through the energy recovery outdoor air inlet; and
    the at least one economizer outdoor air inlet penetrates the one enclosure separate from the energy recovery outdoor air inlet and the economizer damper opens to bring the second stream of the outdoor air into the one enclosure through the at least one economizer outdoor air inlet.

5. The unit of claim 4 further comprising, within the one enclosure:
    at least one cooling coil; and
    an air handler supply fan that moves supply air first through the cooling coil and then to the space, wherein, when the economizer damper is closed:
        the supply air comprises a first portion of return air from the space and the first stream of the outdoor air; and
        the exhaust air that exits the unit through the exhaust air discharge fan is a second portion of the return air from the space.

6. The unit of claim 5 wherein the air handler supply fan, the exhaust air discharge fan, and the outdoor air supply fan all operate when the economizer damper is open.

7. The unit of claim 5 wherein, at least in particular modes of operation, when the economizer damper is open, the air handler supply fan and the outdoor air supply fan both operate and the first stream of outdoor air is treated by the recovery wheel.

8. The unit of claim 5 wherein, when the economizer damper is fully open, the first stream of the outdoor air and the second stream of the outdoor air combine in the unit to provide a combined steam of the outdoor air to the space that is approximately 100 percent of a flow rate of the air handler supply fan when the unit is operated with the economizer damper closed.

9. The unit of claim 4 further comprising, within the one enclosure:
    an energy recovery section comprising:
        a supply air portion;
        an exhaust air portion;
        an energy recovery interior wall separating the supply air portion from the exhaust air portion;
        an opening in the energy recovery interior wall wherein the recovery wheel extends through the opening in the energy recovery interior wall and is located partially in the supply air portion and partially in the exhaust air portion;
        the at least one energy recovery outdoor air inlet wherein the at least one energy recovery outdoor air inlet is connected to the supply air portion;
        the outdoor air supply fan wherein the outdoor air supply fan is located in the supply air portion of the energy recovery section and draws the first stream of the outdoor air into the supply air portion through the energy recovery outdoor air inlet and moves the first stream of the outdoor air through the recovery wheel within the supply air portion;

an exhaust air outlet connected to the exhaust air portion; and the exhaust air discharge fan located in the exhaust air portion of the energy recovery section that moves the exhaust air through the recovery wheel within the exhaust air portion and blows the exhaust air out of the energy recovery section through the exhaust air outlet; and an economizer section comprising:

the supply air passageway, wherein the supply air passageway extends through the economizer section;

an exhaust air passageway extending through the economizer section;

an economizer interior wall separating the supply air passageway from the exhaust air passageway;

the at least one economizer outdoor air inlet wherein the at least one economizer outdoor air inlet is connected to the supply air passageway; and the economizer damper wherein:

the economizer damper is between the at least one economizer outdoor air inlet and the supply air passageway;

when the economizer damper is open, the second stream of the outdoor air is allowed to enter the supply air passageway through the at least one economizer outdoor air inlet; and when the economizer damper is closed, the outdoor air is substantially prevented from entering the supply air passageway through the at least one economizer outdoor air inlet; and wherein:

the one enclosure at least substantially encloses the energy recovery section and the economizer section; and the energy recovery outdoor air inlet, the exhaust air outlet, and the at least one economizer outdoor air inlet each separately penetrate the one enclosure.

10. The unit of claim 9 further comprising, within the one enclosure, an air handling section comprising:

at least one cooling coil; and an air handler supply fan that moves supply air first through the cooling coil and then to the space;

wherein, when the unit is assembled for operation, the economizer section is between the energy recovery section and the air handling section.

11. The unit of claim 9 wherein, when the unit is assembled for operation, the supply air passageway extending through the economizer section connects to the supply air portion in the energy recovery section and the exhaust air passageway extending through the economizer section connects to the exhaust air portion in the energy recovery section.

12. The unit of claim 9 further comprising an air handling section comprising at least one cooling coil; and an air handler supply fan that moves supply air first through the cooling coil and then to the space; wherein, when the unit is assembled and operating:

the supply air passageway extending through the economizer section connects to an outdoor air/return air inlet section of the air handling section;

the exhaust air passageway extending through the economizer section connects to a return air plenum serving the air handling section; and when the economizer damper is open, the first stream of the outdoor air from the recovery wheel and the first stream of the outdoor air from the economizer damper become the supply air.

13. The unit of claim 9 wherein, when the unit is assembled:

the one enclosure comprises:

an inlet side comprising the energy recovery outdoor air inlet and the at least one economizer outdoor air inlet; and an outlet side comprising the exhaust air outlet; and the inlet side is opposite the outlet side.

14. The unit of claim 4 wherein:

the energy recovery outdoor air inlet comprises a first inlet hood external to the one enclosure, and the outdoor air supply fan draws the first stream of the outdoor air into the one enclosure through the first inlet hood; and the at least one economizer outdoor air inlet comprises at least one second inlet hood, separate from the first inlet hood, and the second inlet hood is external to the one enclosure and the economizer damper opens to bring the second stream of the outdoor air into the one enclosure through the at least one second inlet hood.

15. The unit of claim 1 further comprising a power exhaust bypass damper that opens to allow at least part of the exhaust air to exit the unit through the exhaust air discharge fan without passing through the recovery wheel.

16. The unit of claim 15 further comprising:

an energy recovery section comprising:

a supply air portion;

an exhaust air portion;

an energy recovery interior wall separating the supply air portion from the exhaust air portion;

the recovery wheel wherein the recovery wheel extends through an opening in the energy recovery interior wall and is located partially in the supply air portion and partially in the exhaust air portion;

the energy recovery outdoor air inlet, which is connected to the supply air portion;

the outdoor air supply fan wherein the outdoor air supply fan is located in the supply air portion of the energy recovery section and draws the first stream of the outdoor air into the supply air portion through the energy recovery outdoor air inlet and moves the first stream of the outdoor air through the recovery wheel within the supply air portion;

an exhaust air outlet connected to the exhaust air portion; and the exhaust air discharge fan wherein the exhaust air discharge fan is located in the exhaust air portion of the energy recovery section and moves exhaust air through the recovery wheel within the exhaust air portion and blows the exhaust air out of the energy recovery section through the exhaust air outlet; and an economizer section comprising:

the supply air passageway extending through the economizer section;

an exhaust air passageway extending through the economizer section;

an economizer interior wall separating the supply air passageway from the exhaust air passageway;

the at least one economizer outdoor air inlet connected to the supply air passageway; and the economizer damper;

wherein:
the economizer damper is between the at least one economizer outdoor air inlet and the supply air passageway;
when the economizer damper is open, the second stream of the outdoor air is allowed to enter the supply air passageway through the at least one economizer outdoor air inlet;
when the economizer damper is closed, the outdoor air is substantially prevented from entering the supply air passageway through the at least one economizer outdoor air inlet;
the power exhaust bypass damper is between the exhaust air discharge fan and the exhaust air passageway extending through the economizer section;
when the power exhaust bypass damper is open, return air from the return air plenum serving the unit is allowed to exit the exhaust, air passageway through the power exhaust bypass damper, through the exhaust air discharge fan, and through the exhaust air outlet, without passing through the recovery wheel; and
when the power exhaust bypass damper is closed, return air from the return air plenum serving the unit is substantially prevented from exiting the exhaust air passageway through the exhaust air outlet without passing through the recovery wheel.

17. The unit of claim 15 wherein:
the power exhaust bypass damper is opened to avoid over-pressurizing the building when the economizer damper is at least partially open; and
the power exhaust bypass damper is closed to increase effectiveness of the recovery wheel when the economizer damper is closed.

18. The unit of claim 15 wherein the power exhaust bypass damper is modulated to control building static pressure when the economizer damper is at least partially open.

19. The unit of claim 1 wherein building static pressure is modulated based on a signal from a building static pressure sensor.

20. The unit of claim 1 wherein, when the economizer damper is open, speed of the exhaust air discharge fan is modulated to control building static pressure.

21. The unit of claim 1 further comprising a controller that controls the modulating economizer damper position, speed of the recovery wheel, and mechanical cooling based on parameters that include:
the supply air temperature set point;
measured outdoor air temperature;
measured outdoor air humidity, enthalpy, or dew point;
measured space or return air temperature; and
measured space or return air humidity, enthalpy, or dew point.

22. The unit of claim 1 wherein:
the economizer damper is opened to bring in more than a minimum ventilation requirement of outdoor air when a first set of conditions exist;
the first set of conditions includes outdoor air enthalpy being less than return air enthalpy;
the first set of conditions includes outdoor air dew point being less than return air dew point;
the first set of conditions includes outdoor air temperature being less than return air temperature; and
the first set of conditions includes the outdoor air temperature being greater than a minimum threshold temperature set point.

23. The unit of claim 22 wherein:
the economizer damper is closed, and energy recovery is provided with the recovery wheel, when any one of a second set of conditions exists;
the second set of conditions includes the outdoor air enthalpy being greater than the return air enthalpy;
the second set of conditions includes the outdoor air temperature being greater than the return air temperature; and
the second set of conditions includes the outdoor air dew point being greater than a maximum threshold dew point set point and the outdoor air dew point being greater than the return air dew point.

24. The unit of claim 1 wherein:
the economizer damper is closed, and energy recovery is provided with the recovery wheel, when any one of a second set of conditions exists;
the second set of conditions includes the outdoor air enthalpy being greater than the return air enthalpy;
the second set of conditions includes the outdoor air temperature being greater than the return air temperature; and
the second set of conditions includes the outdoor air dew point being greater than a maximum threshold dew point set point and the outdoor air dew point being greater than the return air dew point.

25. The unit of claim 1 wherein the unit provides compliance with ASHRAE standard 90.1, 2013.

26. A unit for ventilating a space within a building, the unit comprising:
a recovery wheel;
a supply air outlet from the recovery wheel, wherein the supply air outlet includes a supply air passageway;
an outdoor air supply fan that draws a first stream of outdoor air into the unit and moves the first stream of the outdoor air through the recovery wheel to the supply air outlet;
an economizer damper that opens to bring a second stream of the outdoor air into the supply air outlet; and
an exhaust air discharge fan that moves exhaust air from the space through the recovery wheel and blows the exhaust air out of the unit to the outdoors;
wherein:
the economizer damper is opened to bring in more than a minimum ventilation requirement of outdoor air when a first set of conditions exist;
the first set of conditions includes outdoor air enthalpy being less than return air enthalpy;
the first set of conditions includes outdoor air dew point being less than return air dew point;
the first set of conditions includes outdoor air temperature being less than return air temperature; and
the first set of conditions includes the outdoor air temperature being greater than a minimum threshold temperature set point; and
the economizer damper is closed, and energy recovery is provided with the recovery wheel, when any one of a second set of conditions exists;
the second set of conditions includes the outdoor air enthalpy being greater than the return air enthalpy;
the second set of conditions includes the outdoor air temperature being greater than the return air temperature; and
the second set of conditions includes the outdoor air dew point being greater than a maximum threshold dew point set point and the outdoor air dew point being greater than the return air dew point.

27. The unit of claim 26 wherein the unit comprises an air handler supply fan and, when the economizer damper is fully open, the first stream of the outdoor air and the second stream of the outdoor air combine in the unit to provide a combined steam of the outdoor air to the space that is approximately 100 percent of a flow rate of the air handler supply fan when the unit is operated with the economizer damper closed.

28. The unit of claim 26 wherein the economizer damper is closed and energy recovery is provided with the recovery wheel when the outdoor air temperature is less than the minimum threshold temperature set point regardless whether the second set of conditions exists.

29. The unit of claim 26 wherein, when the economizer damper is open, the economizer damper is modulated to maintain a supply air temperature set point.

30. The unit of claim 26 wherein, when the economizer damper is open, the unit is operated without the need for a return air damper to regulate or modulate flow of return air from the building in order to have the desired amount of outdoor air.

31. The unit of claim 26 wherein, when the economizer damper is open, building static pressure is controlled by controlling powered exhaust airflow of the exhaust air discharge fan.

32. A unit for ventilating a space within a building, the unit comprising:
- a recovery wheel;
- an energy recovery outdoor air inlet into the unit from outdoors;
- a supply air outlet from the recovery wheel, wherein the supply air outlet includes a supply air passageway;
- an outdoor air supply fan that draws a first stream of outdoor air into the unit from the outdoors through the energy recovery outdoor air inlet and moves the first stream of the outdoor air through the recovery wheel to the supply air outlet;
- at least one economizer outdoor air inlet into the unit from the outdoors;
- an economizer damper that opens to bring a second stream of the outdoor air into the unit from the outdoors, wherein:
  - the economizer damper is between the at least one economizer outdoor air inlet and the supply air outlet;
  - when the economizer damper is open, the second stream of the outdoor air is allowed to enter the supply air outlet from the outdoors through the at least one economizer outdoor air inlet, without passing through the recovery wheel;
  - when the economizer damper is open, the economizer damper is modulated to maintain a supply air temperature set, point;
  - when the economizer damper is open, the unit is operated without the need for a return air damper to regulate or modulate flow of return air from the building in order to have the desired amount of outdoor air; and
  - when the economizer damper is closed, the outdoor air is substantially prevented from entering the supply air outlet from the outdoors through the at least one economizer outdoor air inlet; and
- an exhaust air discharge fan that moves exhaust air from the space through the recovery wheel and blows the exhaust air out of the unit to the outdoors.

* * * * *

UNITED STATES PATENT AND TRADEMARK OFFICE
CERTIFICATE OF CORRECTION

PATENT NO. : 10,364,995 B2  
APPLICATION NO. : 14/968390  
DATED : July 30, 2019  
INVENTOR(S) : John C. Fischer et al.

Page 1 of 1

It is certified that error appears in the above-identified patent and that said Letters Patent is hereby corrected as shown below:

In the Claims

In Column 29, in Claim 1, Line 1, change "budding" to "building".

In Column 30, in Claim 3, Line 4, change "steam" to "stream".

In Column 30, in Claim 8, Line 4, change "steam" to "stream".

In Column 35, in Claim 27, Line 5, change "steam" to "stream".

In Column 36, in Claim 32, Line 20, change "set, point" to "set point".

Signed and Sealed this  
Fifteenth Day of October, 2019

Andrei Iancu  
*Director of the United States Patent and Trademark Office*